United States Patent [19]

Dillard

[11] Patent Number: 5,370,539

[45] Date of Patent: Dec. 6, 1994

[54] SCALE AND CHORD INDICATOR DEVICE

[76] Inventor: Homer E. Dillard, 12667 Lonsdale, Bridgeton, Mo. 63044

[21] Appl. No.: 852,012

[22] Filed: Mar. 16, 1992

[51] Int. Cl.$^5$ .............................................. G09B 15/00
[52] U.S. Cl. ................................. 434/405; 84/471 R; 434/404
[58] Field of Search ................. 84/471 R X, 471 SR, 84/472; 434/404, 405

[56] References Cited

U.S. PATENT DOCUMENTS

| | | | |
|---|---|---|---|
| 2,692,526 | 10/1954 | Watson | 84/472 X |
| 2,944,349 | 7/1960 | Kaufman | 434/405 |
| 3,592,099 | 7/1971 | Gibby | 84/471 R X |
| 3,691,895 | 9/1972 | Nessler | 84/471 SR X |
| 3,771,409 | 11/1973 | Rickey | 84/471 SR X |
| 3,791,254 | 2/1974 | Müller | 84/471 SR X |
| 4,444,083 | 4/1984 | Apel et al. | 84/472 X |

Primary Examiner—Cary E. O'Connor
Assistant Examiner—L. Thomas
Attorney, Agent, or Firm—Henry W. Cummings

[57] ABSTRACT

A chord or scale indicating device includes at least one fixed member and at least one movable member. On one of the fixed or movable members a scale is provided of at least one octave including both the white and black notes of the octave. In this octave, the white notes A, G and D, are greater in transverse or radial extent than the white notes E, F, B, and C by a factor of about 1.5. The other of the fixed and movable members includes a series of indicating positions which indicate at least one scale or chord position for a given input key. Relative movement between the fixed and the movable member will enable the scale and or chord positions to be determined for each of the notes in the ocatve by such relative movement. Some of the embodiments disclosed in the specification are linear where the relative movement between the fixed and the movable member is either lateral or vertical and some of the embodiments disclosed are radial embodiments wherein rotational movement between the fixed and the movable member occurs. The embodiments disclosed include the major scale positions and both minor scale positions. The embodiments further include all of the chords for the given input key and related chords for the input key including the subdominant chord and dominant seventh related chord. For the given input key the major and minor tonic chords, the augmented chords, the sixth chords, the major and minor seventh chords, the diminished chords, the dominant and diminished ninth chords are included. The device is particularly useful in teaching students the relationship of the scales and chords illustrate. In a preferred embodiment the keyboard positions for both the treble clef and bass clef are included for all of the chords of all input keys.

8 Claims, 36 Drawing Sheets

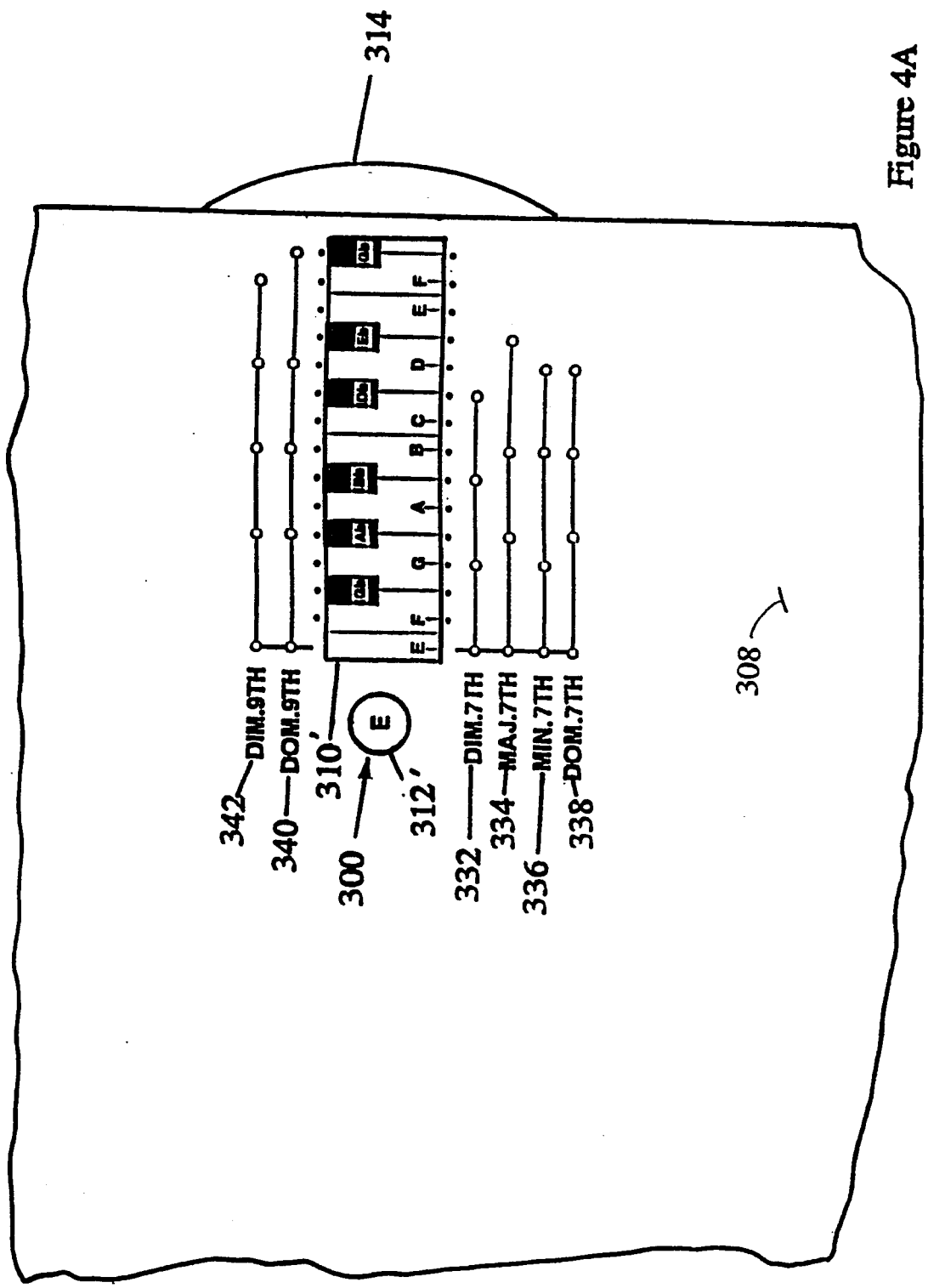

Chord Master

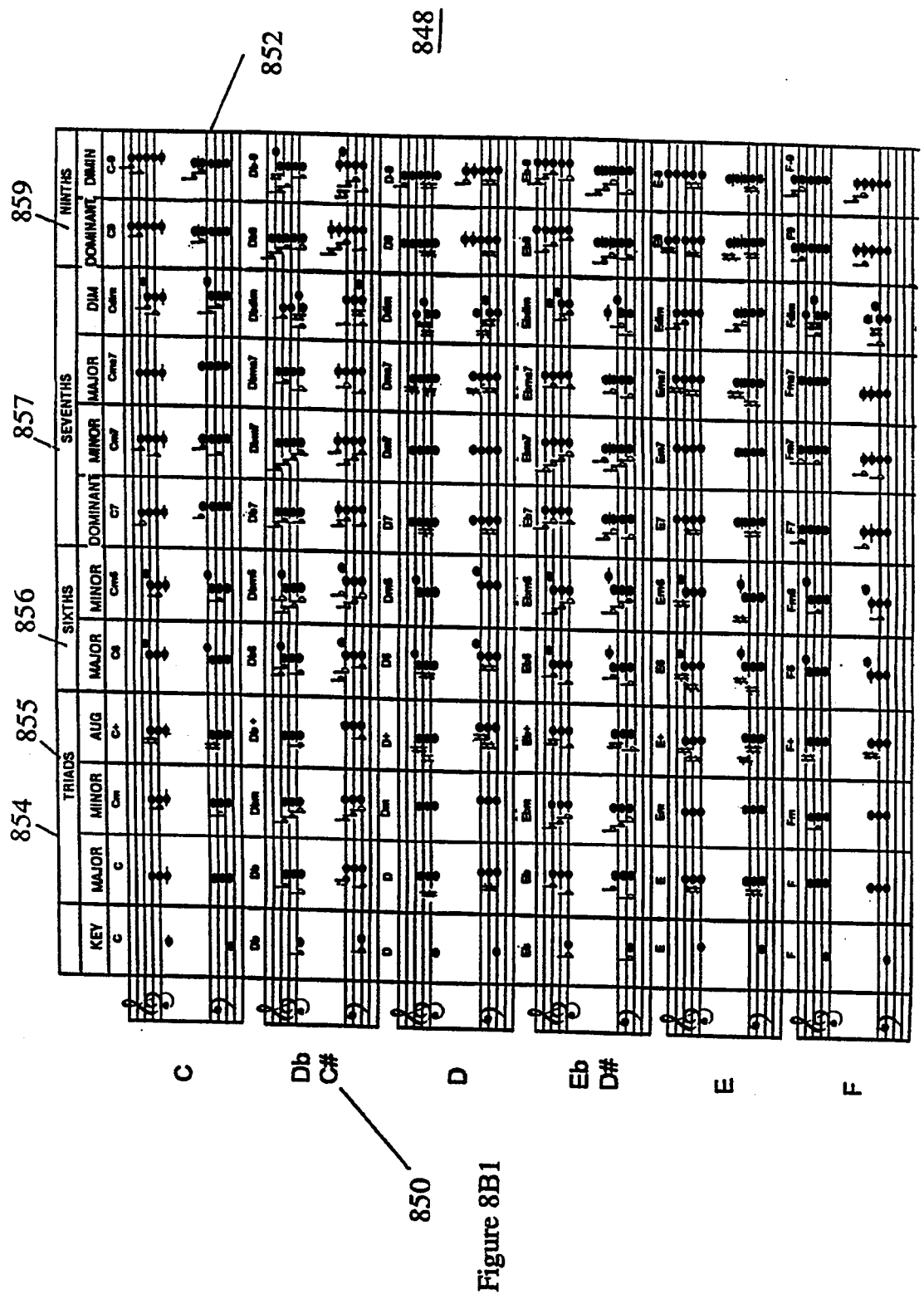
Figure 8B1

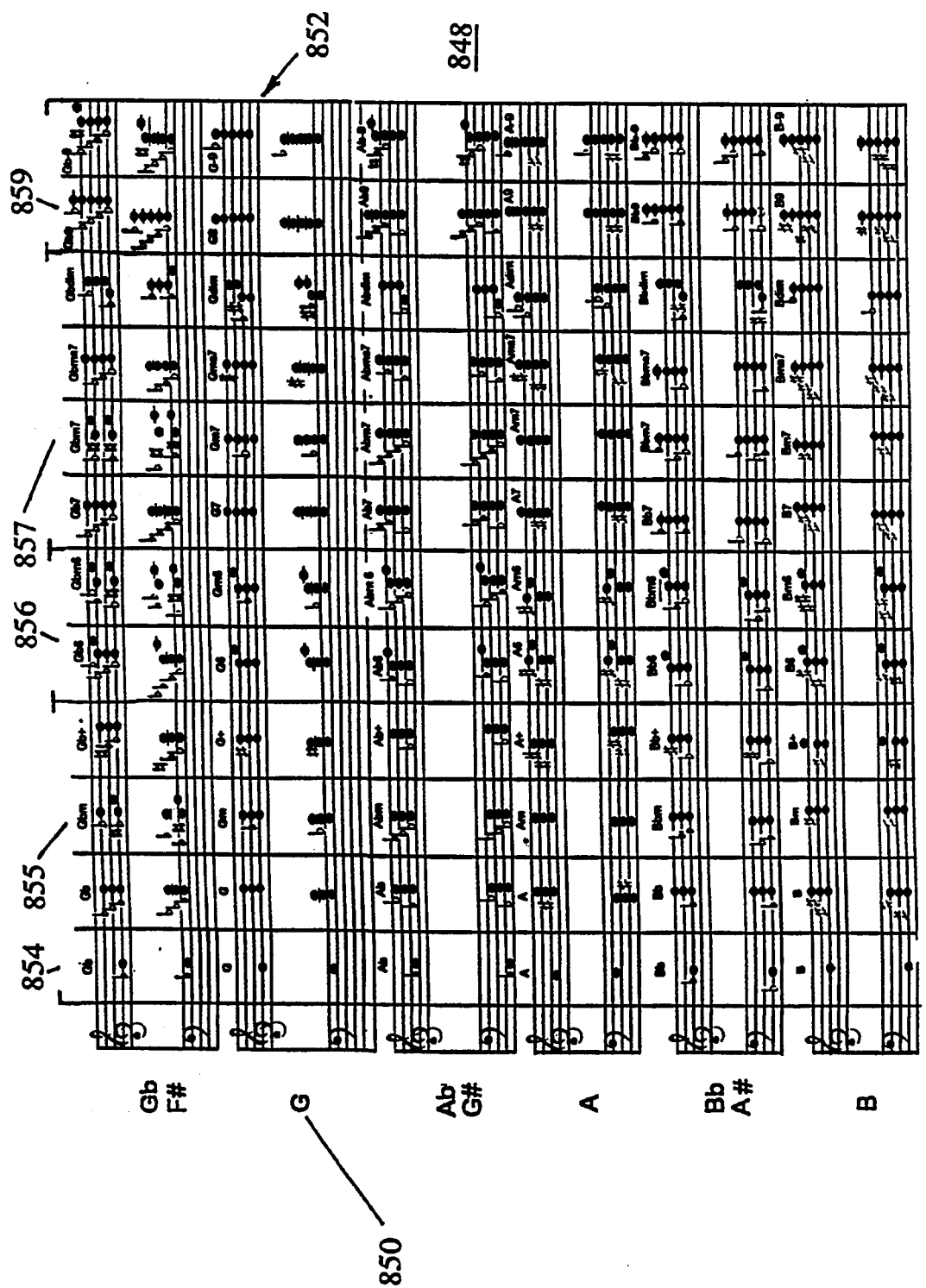
Figure 8B2

SCALE AND CHORD INDICATOR DEVICE

BACKGROUND OF THE INVENTION

Identifying the notes and timing of a musical score are taught to music students via a combined time signature scale, clef, sharp, flat, note, key symbology and a spatially relevant line space staff note positional relationship. This methodology in conjunction with specific nomenclature for chord structures e.g. tonic, dominant seventh, sub-dominant, diminished, augmented, 6ths, 7ths, 9ths, major, minor etc., is used to graphically relate musical information to the performing musical artist, thereby enabling that person to play the music as written by the composer. See attached chord chart, FIG. 8B.

The accomplished musical performer must relate what is observed in time and space, sequentially in the musical score, into an interpretative spatial positioning of his hands, fingers, feet, lips, breath or voice as is required for the instrument being played be it mechanical, electromechanical or the human voice.

Prior to the existance of written music, and even today, some musical instruments are learned and played by rote i.e. without a musical score. For example, the self taught individual can often learn a fixed chord or pleasing sequential routine and though repetition of these chord forms and phrases, learn to play in a mechanically routine way, often without obtaining formal knowledge of written music. This so called "Learning to Play by Ear" contrasts with reading the music and "Learning to Play by Note".

Many professional pianists combine improvisational techniques playing a melody line with the right hand and defined chord structures with the left hand. So called "Fake Books" make use of this means of communicating the musical score by only depicting the melody line, timing, the desired key and the associated chord nomenclature. This short hand version of the musical score truncates the complexity of the written music, giving the musician full freedom to improvise and develop his own style or technique, while maintaining the basic theme or melody line as intended by the original composer.

Developing the knowledge and digital dexterity required to read the full blown score or even truncated versions of the music requires much concentrated effort and practice in relating the spatial position of the human appendages required to translate the written graphic information to pleasing instrumental music.

Teaching the music student to read currently involves a series of music books from beginner through advanced that are used to gradually increase the student's knowledge by playing over a number of years, a sequence of increasingly difficult pieces in varying keys, playing scales, fingering exercises, chords. In more advanced years the student is given musical theory.

Many students lose interest and drop from music programs early in life because of the long arduous task of accomplishing the necessary human musical spatial translation ability, i.e. from the written music to the instrument. Other players cannot read or don't understand chords.

The music theory, usualy taught late in a musician's education, teaches the inter-relationships of chromatic/diatonic, major, musical notation for the selected chords and scales.

The invention is portable and Can be realized in many embodiments for different instruments and can be manufactured from many different materials. The invention linearly or circularly computes all of the aforementioned parameters and presents the results in a windowed or surface display along with the spatial position for each of the associated scales and chord structure as shown on one or more surfaces of the invention. The device can be constructed small enough to fit in a pocket, large enough to be used for a class room instruction or in other forms to be made to hang around the student's neck in the form of a pendant.

SUMMARY OF THE INVENTION

To solve the problems of providing students and players information on musical theory and identifying useful scales and chord structures in any key, the present invention comprises a method and apparatus for translating an input key into the following information:

1. Major Scales:
   Chromatic
   Diatonic
2. Minor Scales:
   Melodic
   Harmonic
3. Triads:
   Minor:
      Tonic
      Augmented
   Major:
      Tonic
      Augumented
4. Sixths:
   Minor
   Major
5. Dominant Seventh Related Chord
6. Sub Dominant
7. Sevenths in key:
   Major
   Minor
   Dominant
   Diminished
8. 9ths in key:
   Dominant
   Diminished Also, the invention has the function of depicting the spatial position on the instrument required to evoke the selected chords or scale intervals, as well as means for showing the minor scales, and the permutations and combinations of harmonic intervals that make up all chord structures.

Scales in any key and chords in any key and their spatial relationships on the selected instrument are identified, along with the mathematical relationships of harmonies and physics of music.

Musical patterns are identified in key transpositions that are pleasing and basic to composing music. If this information were made available to the student earlier in the learning period, much of the difficulty of identifying the scales and chord structures would be eliminated and the student could advance at a more rapid learning rate in gaining the required musical knowledge.

Players who play by ear can easily learn to read chords and a melody note if they are given the opportunity to learn these concepts relatively quickly.

Players who read note for note can finally understand what music is really about in terms of melody and chords.

A chord or scale indicating device includes at least one fixed card member and at least one movable card member for example, made of strong cardboard. On one of the fixed or movable members a scale is provided of at least one octave including both the white and black notes of the octave. In this octave, the white notes A, G and D, are greater in transverse or radial extent than the white notes E, F, B, and C by a factor of about 1.5. The other of the fixed and movable members includes a series of indicating positions which indicate at least one scale or chord position for a given input key. Relative movement between the fixed and the movable member will enable the scale and or chord positions to be determined for each of the notes in the ocatve by such relative movement. Some of the embodiments disclosed in the specification are linear where the relative movement between the fixed and the movable member is either lateral or vertical and some of the embodiments disclosed are radial embodiments wherein rotational movement between the fixed and the movable member occurs. The embodiments disclosed include the major scale positions and both minor scale positions. The embodiments further include all of the chords for the given input key and related chords for the input key including the subdominant chord and dominant seventh related chord. For the given input key the major and minor tonic chords, the augmented chords, the sixth chords, the major and minor seventh chords, the diminished chords, the dominant and diminished ninth chords are included. The device is particularly useful in teaching students the relationship of the scales and chords illustrate. In a preferred embodiment the keyboard positions for both the treble clef and bass clef are included for all of the chords of all input keys.

THE DRAWINGS

Figure 2:
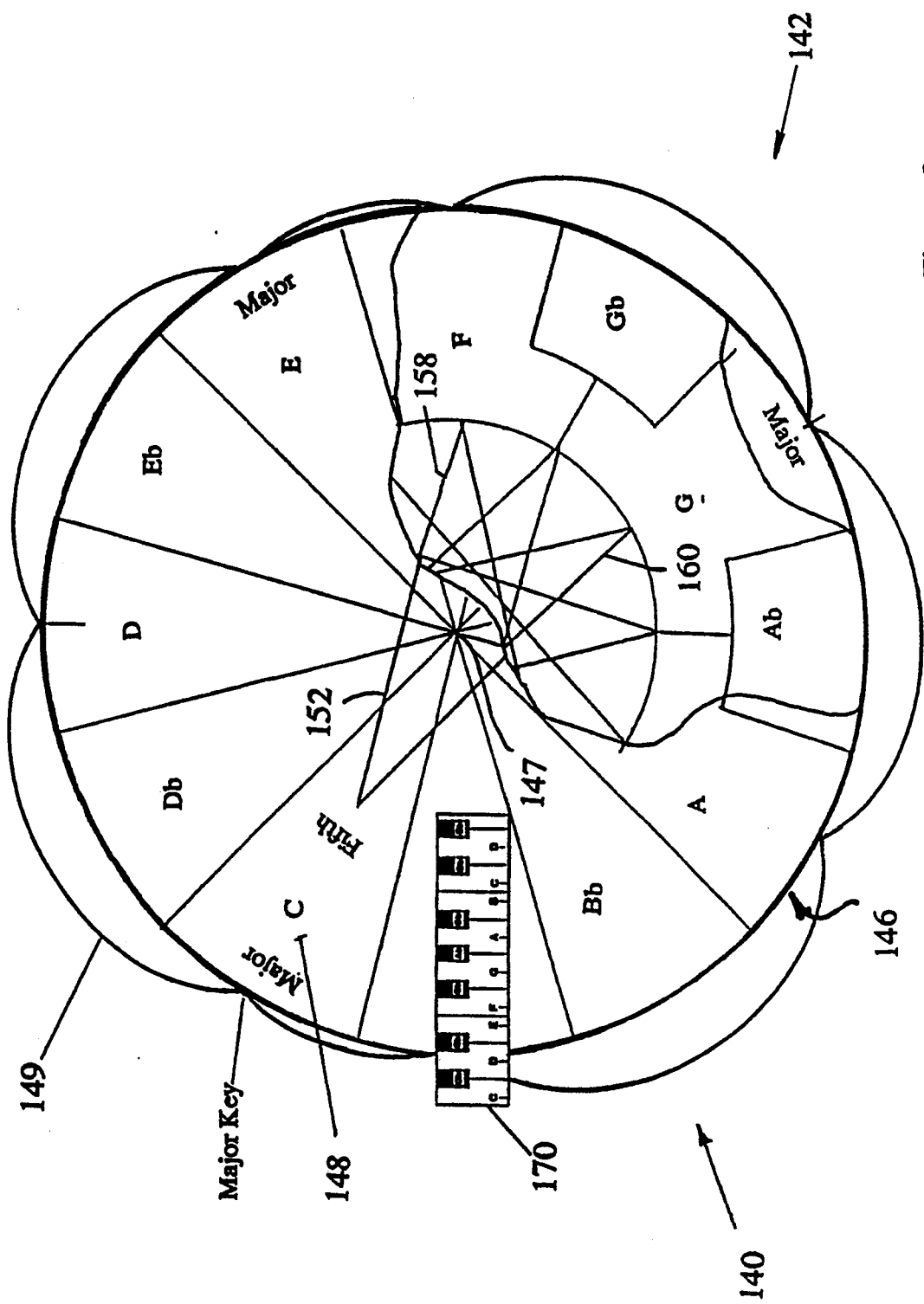

FIG. 2 is a view of a radial embodiment wherein scale and chord positions are provided on a fixed member and the octave is provided on a circular movable member in which the black keys are located radially outwardly from the main portion of the white keys and wherein the circular movable member may be rotated to indicate the positions of the scale and chords for a selected key and wherein related chords can be obtained for a given input key through lines located in the center or midportion of the circular movable member.

Figure 2A:
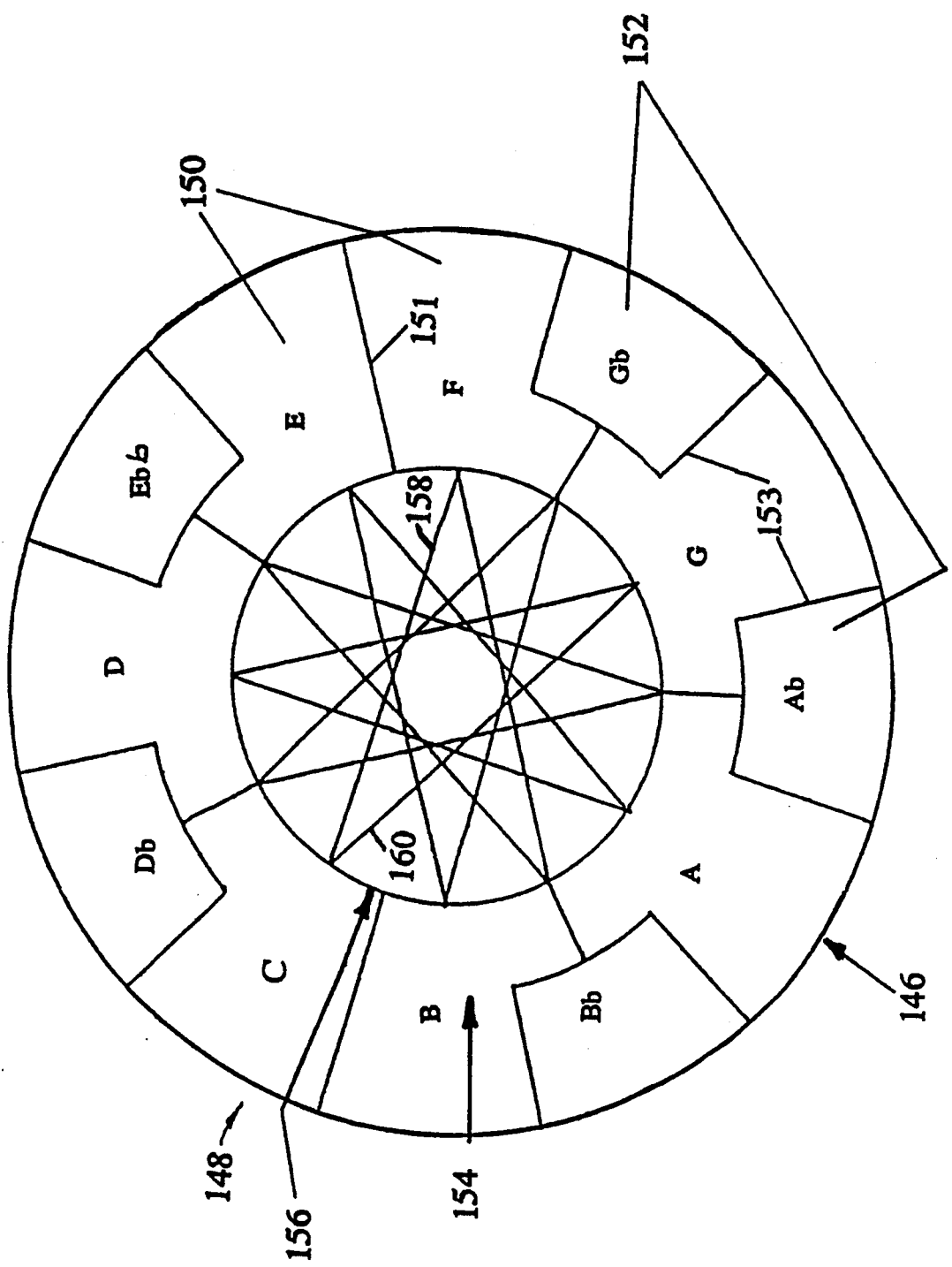

FIG. 2A is a view of the circular movable member with the black notes located in the outer pheriferal portion of the circular movable member and wherein related chord lines are provided on the center or midportion of the movable member.

Figure 2B:
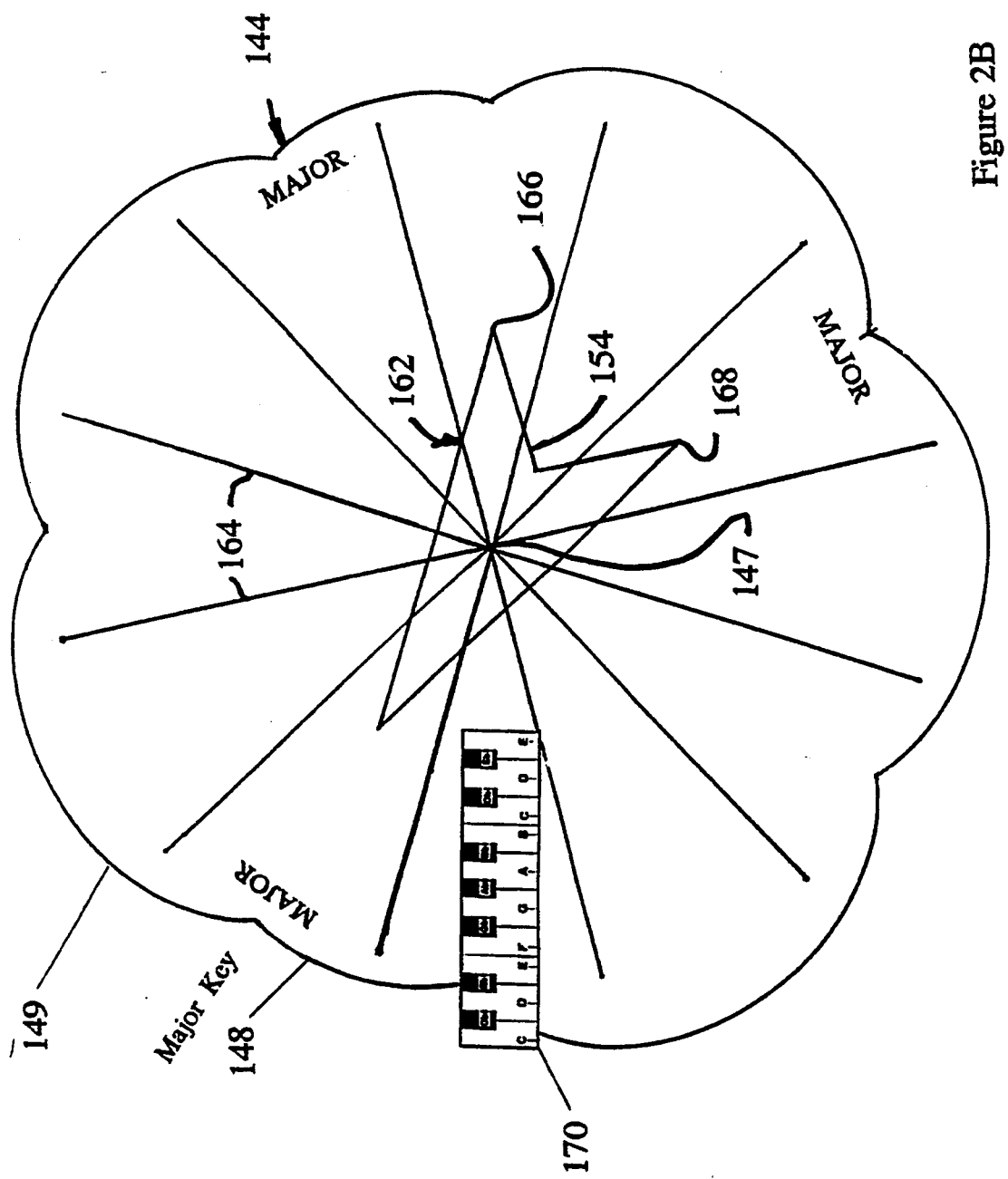

FIG. 2B is a view of the fixed member illustrated in FIG. 2.

Figure 3:
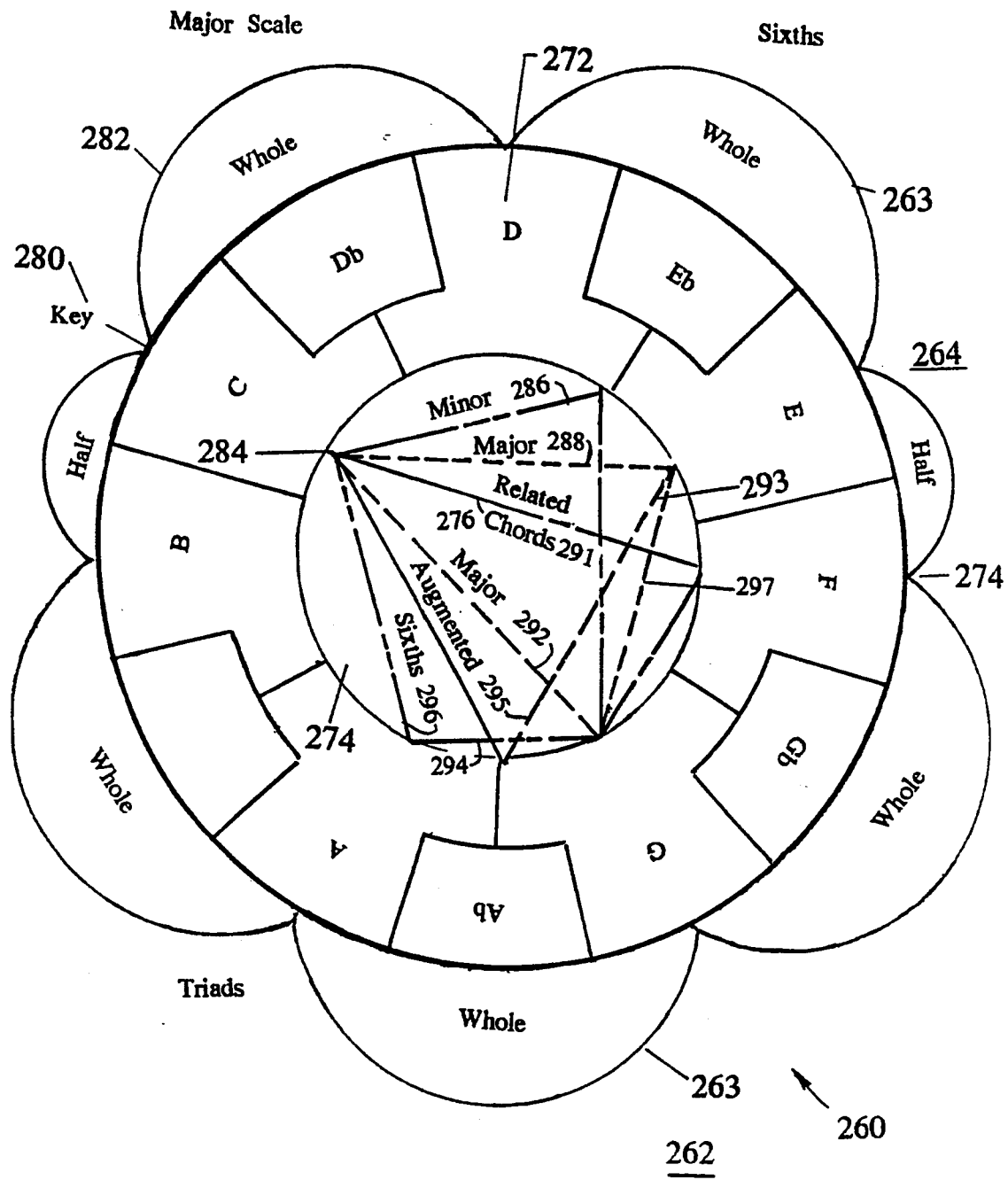

FIG. 3 is a plan view of an embodiment which includes a fixed member and four movable members. The fixed member includes two sides: one side major scale positions are indicated, and on a second side minor scale positions are provided. FIG. 3 indicates major scale positions. FIG. 3 further illustrates two of the movable members, one being greater in diameter than the other. The larger diameter movable member includes the octave with the black note positions located radially outwardly from the main portion of the white notes.

Figure 3A:
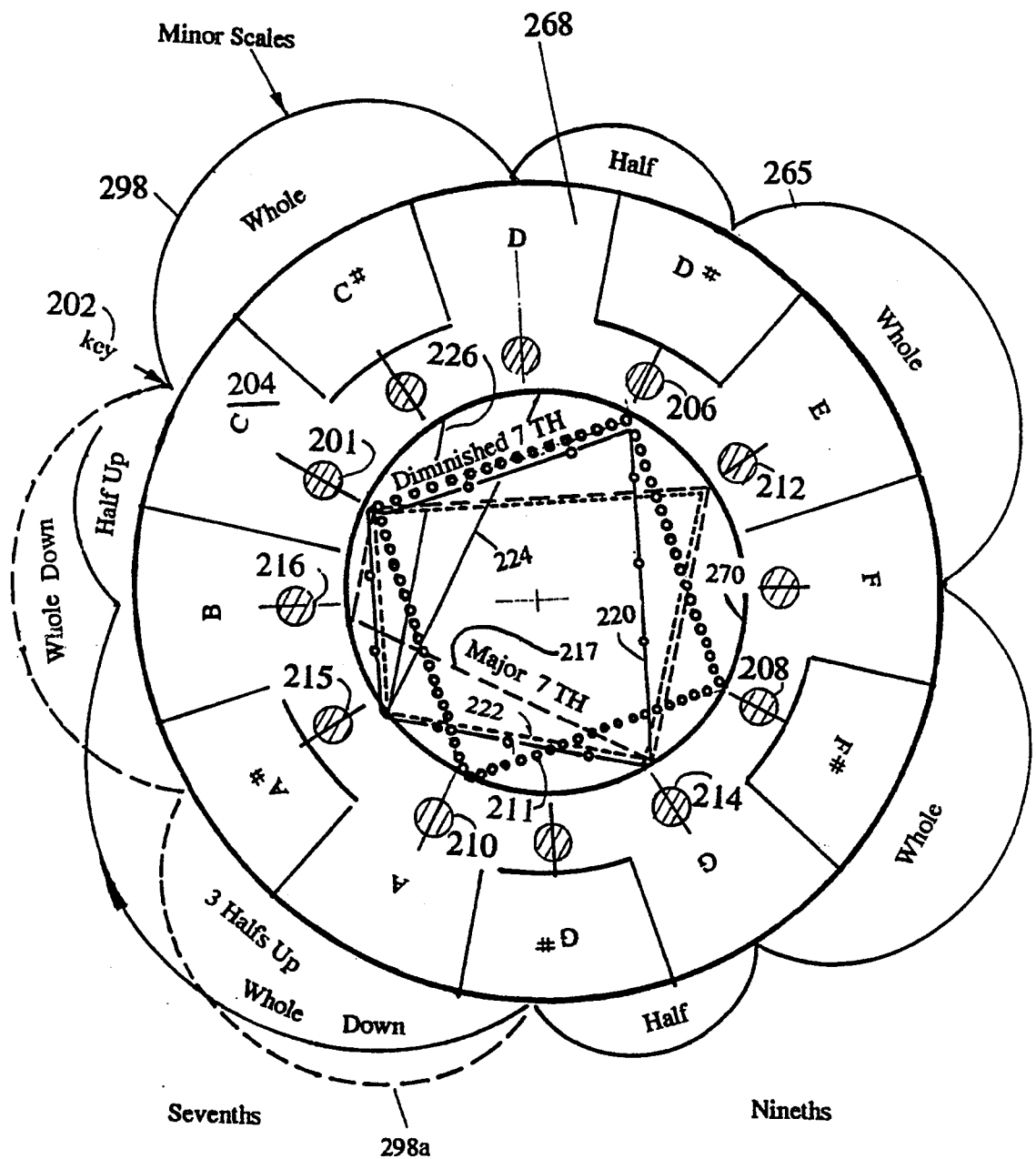

FIG. 3A is a view of the second side of the fixed member illustrating minor scale positions and also illustrating two additional movable members located upon the fixed member. The larger of the movable members again includes the octave with the black notes being located in the outer periphery of the larger movable member. The smaller movable member is located radially inwardly from the larger movable member and indicates chord positions.

Figure 3B:
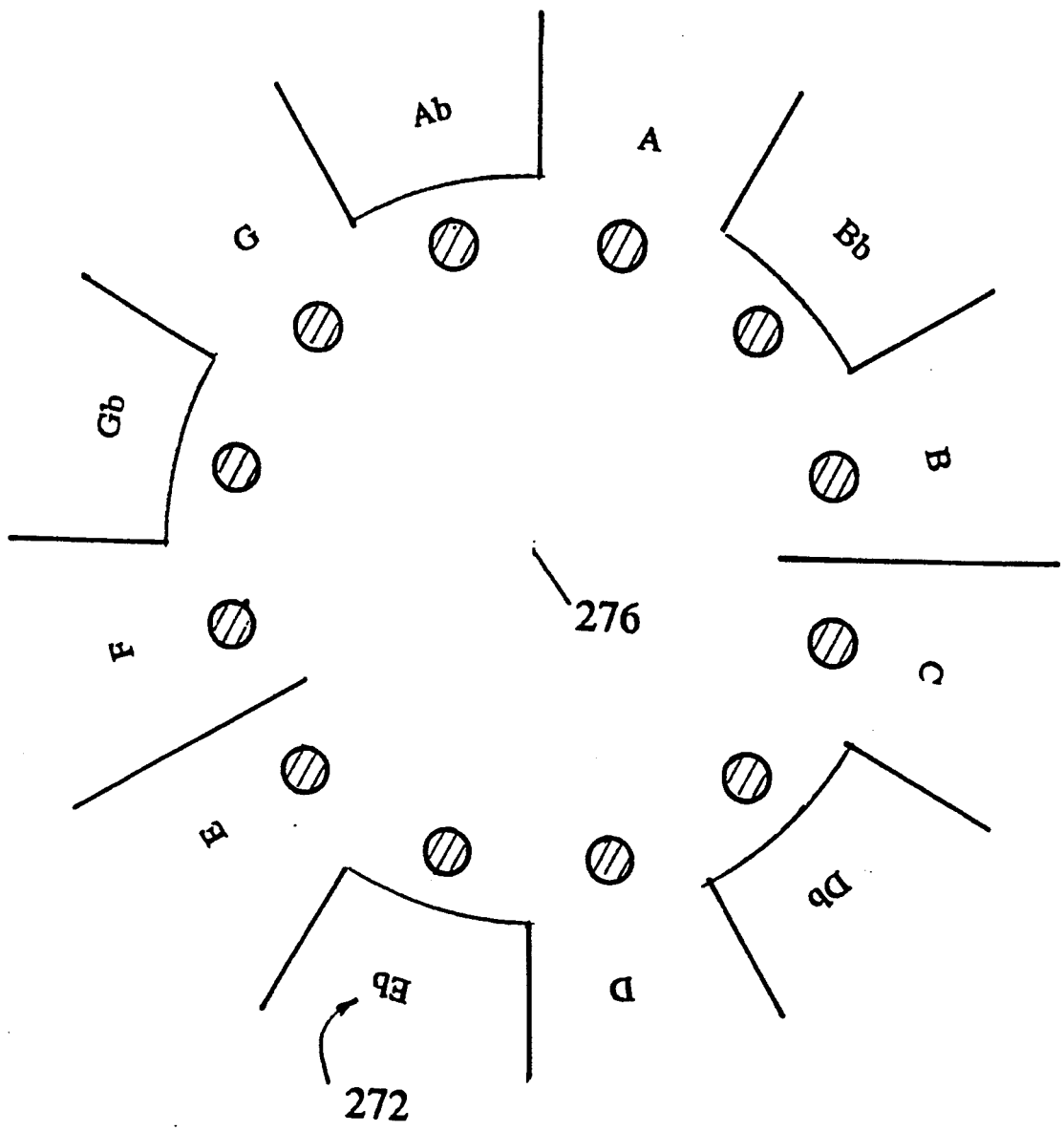

FIG. 3B is a view of the first larger movable member including the octave; with black notes located radially outwardly from the body portion of the white notes and further including with a series of circular dots the input key for the movable member.

Figure 3C:
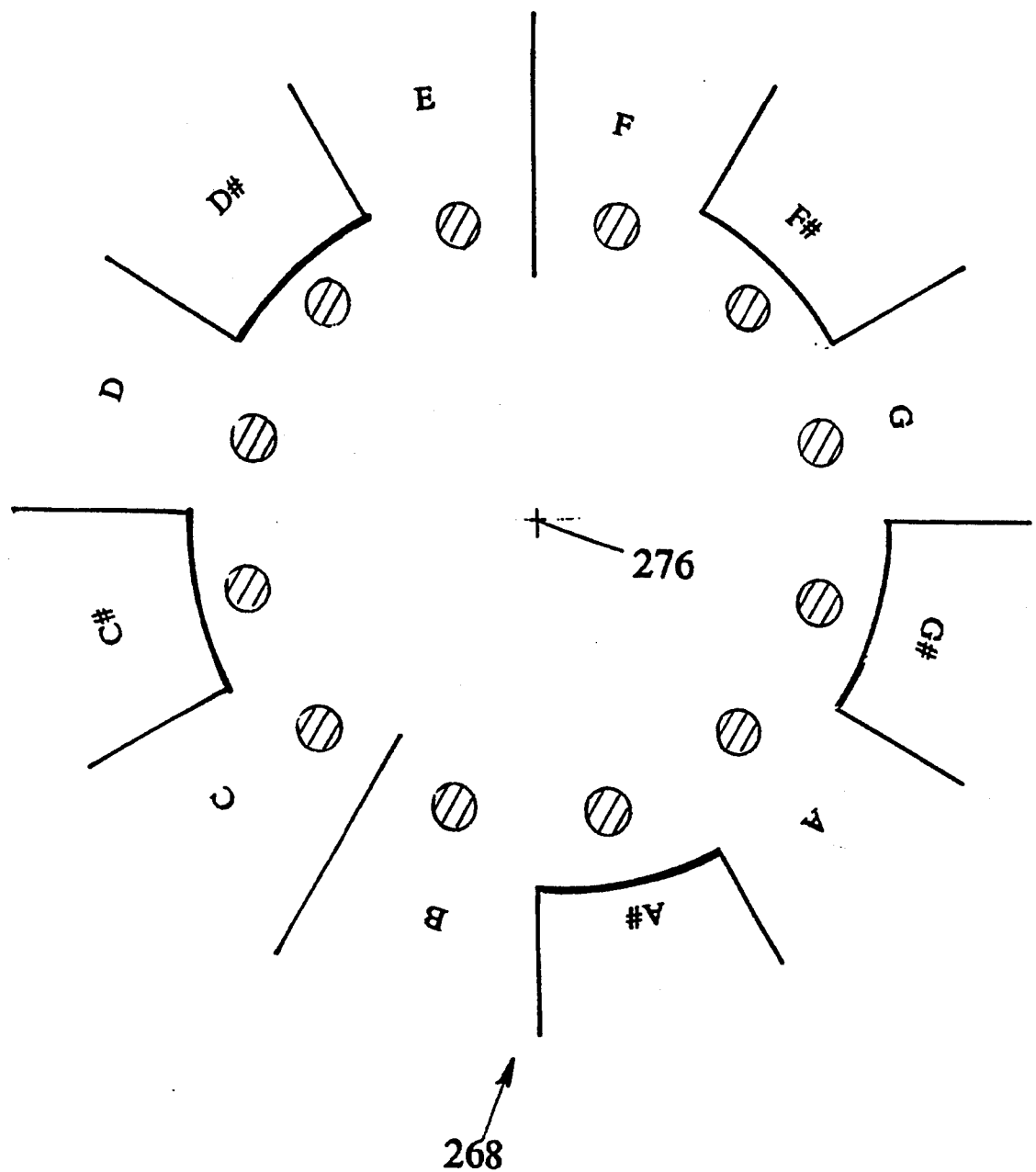

FIG. 3C is a view similar to FIG. 3B illustrating the second larger movable member with the black notes located radially outwardly from the white notes and further including a circular input key series of dots.

Figures 3D, 3E:
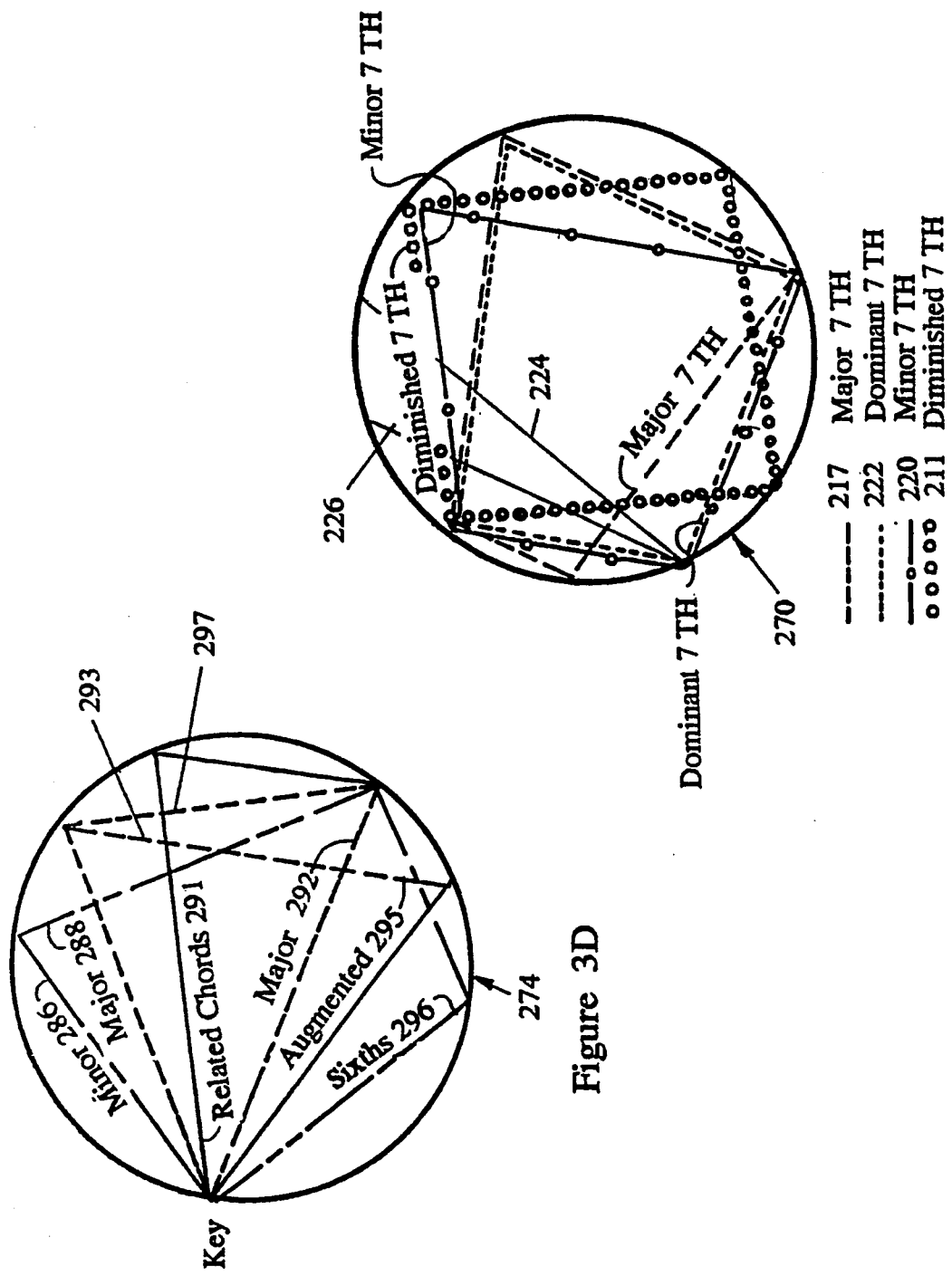

FIG. 3D is a view of the first smaller circular movable member which indicates various chords for the input key.

FIG. 3E is a view of the other smaller movable members indicating the seventh chords for the particular input key.

Figure 3F:
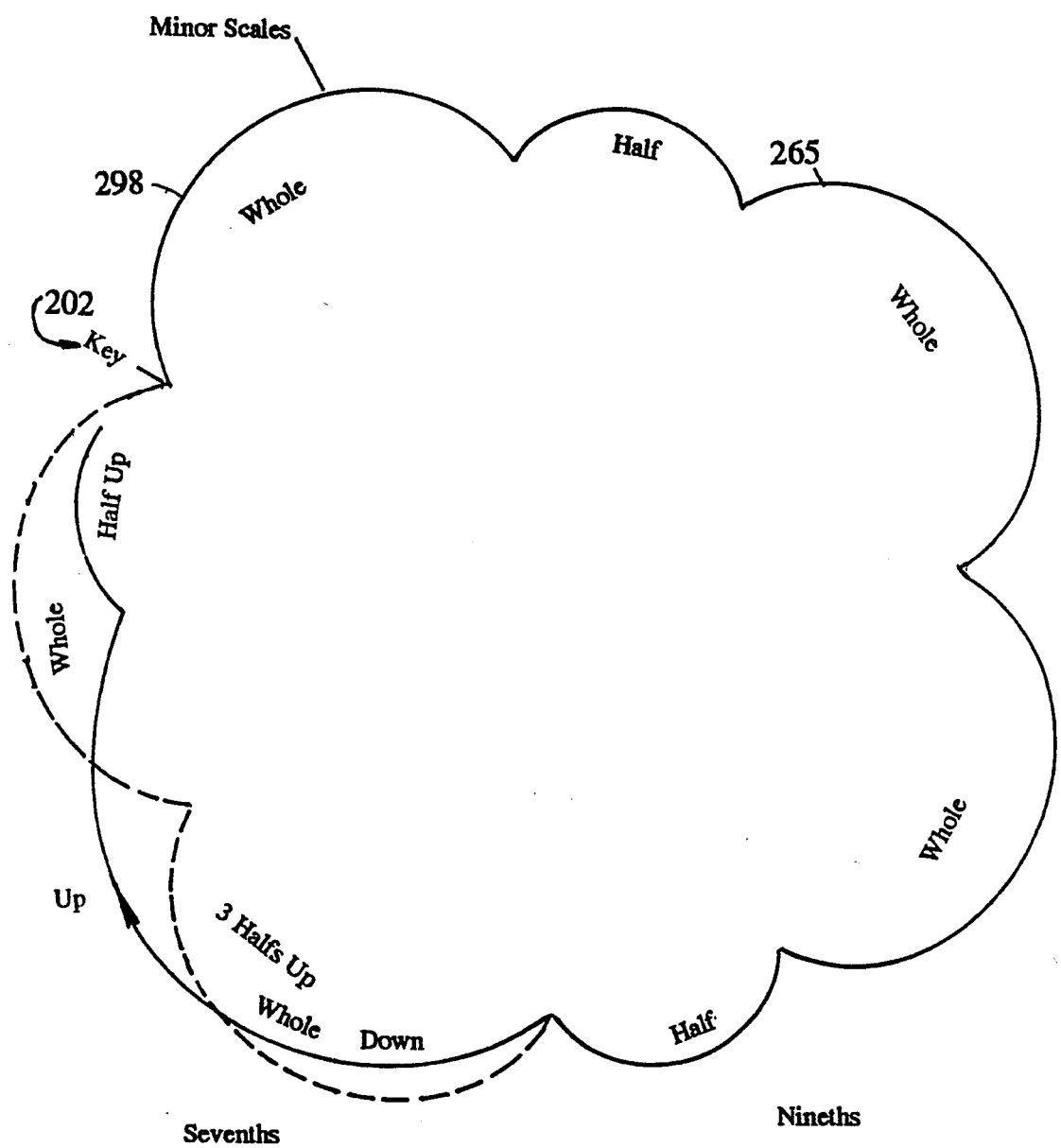

FIG. 3F is a view of the second side of the fixed member illstrating the lobes for determining minor scales.

Figure 4:
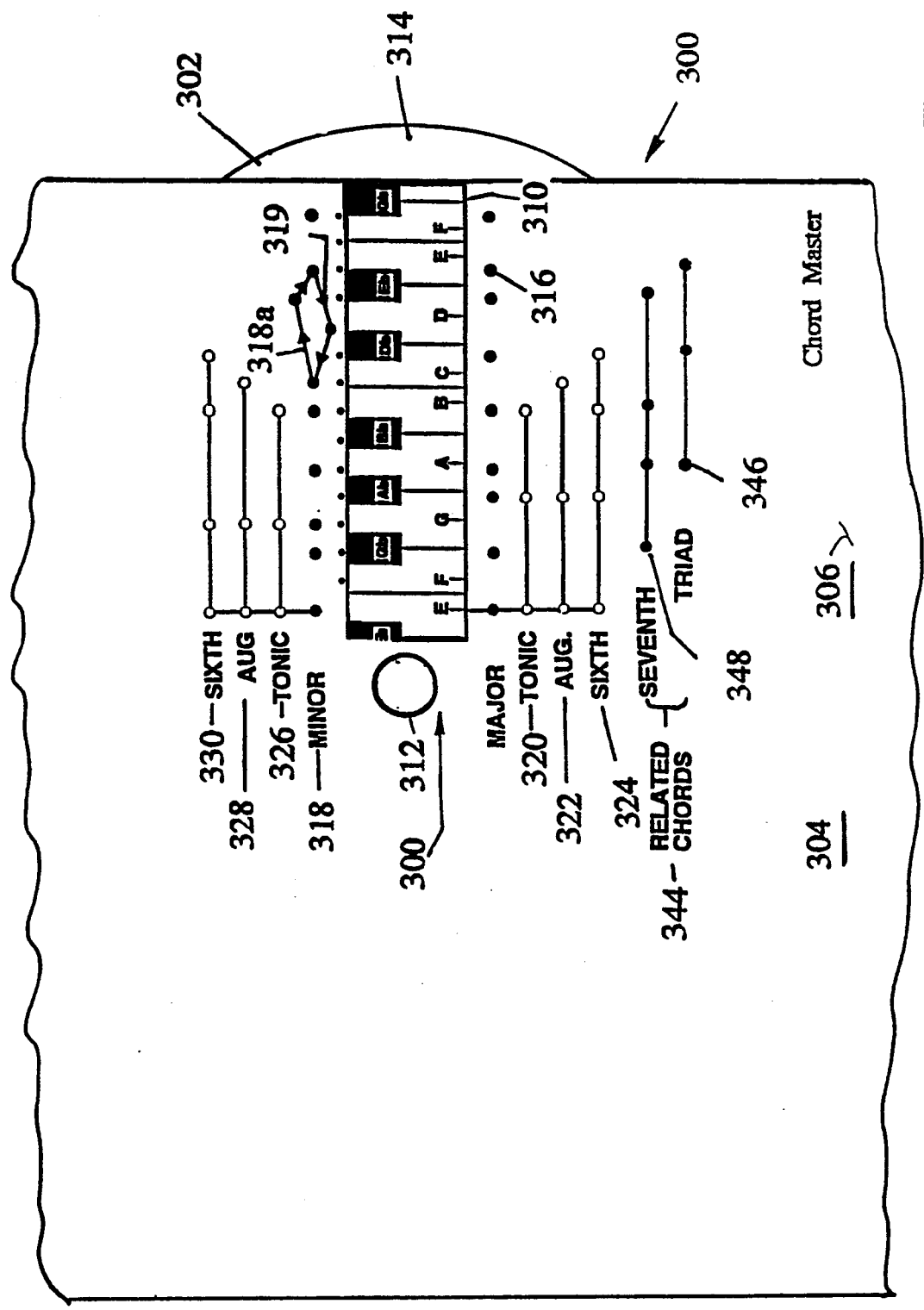

FIG. 4 is a plan view of an embodiment wherein major and minor scale positions are provided on the fixed member and chord positions are also provided on the fixed member. The movable member is rotatable relative to the fixed member and an opening is provided in the fixed member whereby the octaves can be seen for each of the keys which are inputted to determine the major and minor scales and the chords therefor.

FIG. 4A is a view of the second side of the fixed member illustrated in FIG. 4; also illustrating the seventh and ninth chords for the particular octave which is inputted.

Figure 4B:
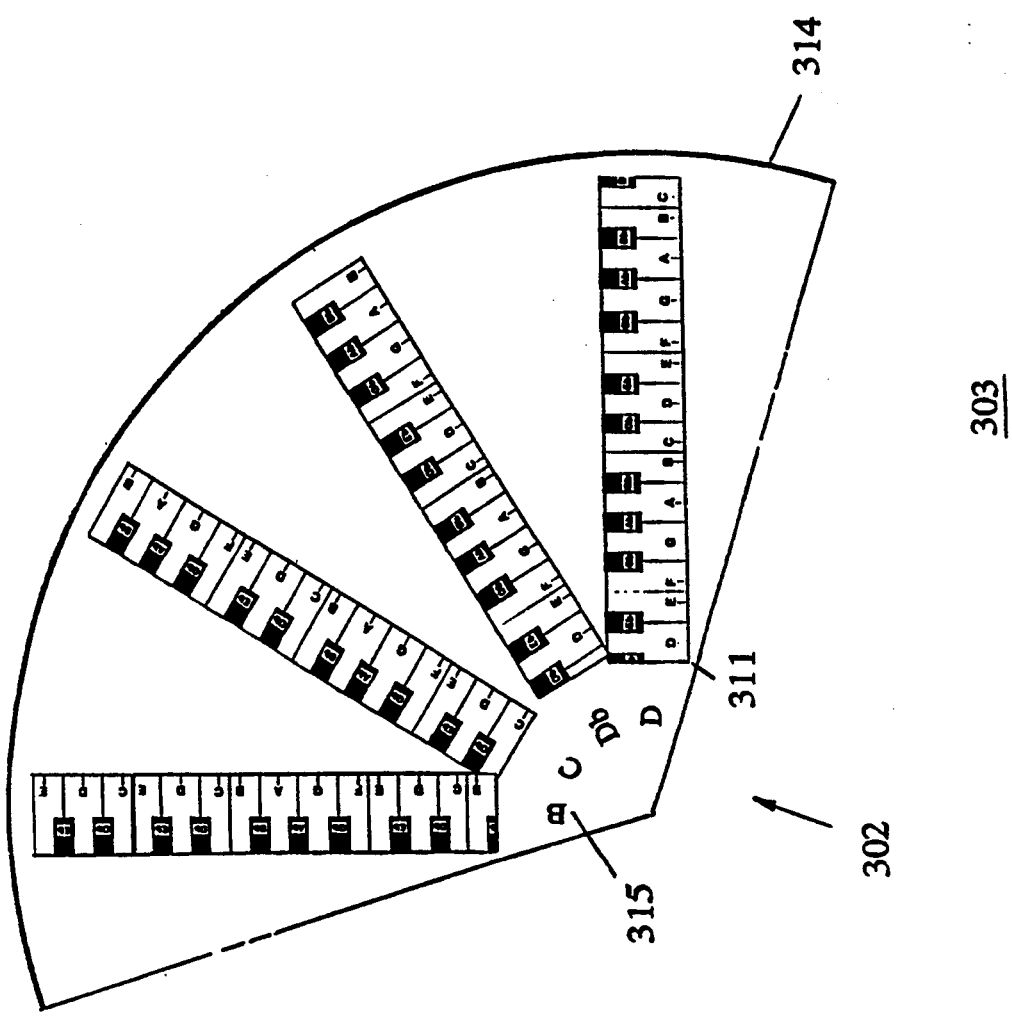

FIG. 4B is a view which illustrates the radially extending octaves on the movable member with each octave beginning on a different note so that all octaves in the scale are included. Furthermore, in the mid portion of the movable member a scale is included which correspondes to the input key which is viewable through an opening on the fixed member.

Figure 4C:
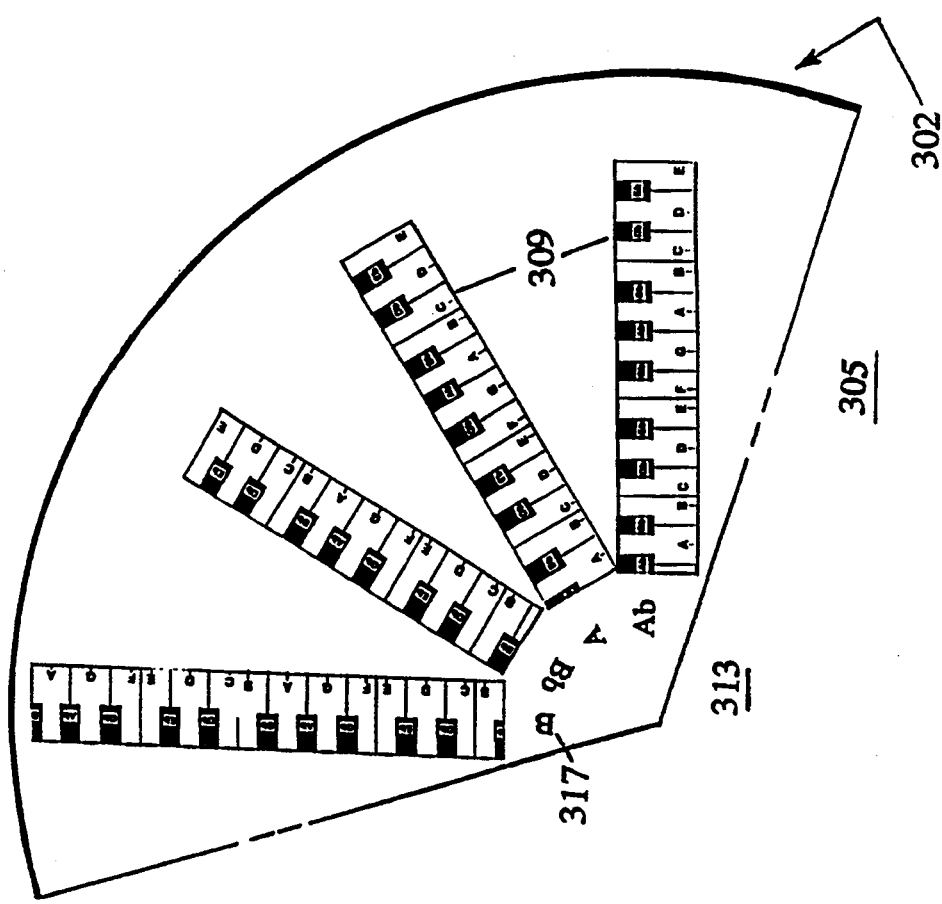

FIG. 4C is a view similar to FIG. 4B but illustrating the radially extending octaves on the second side of the movable member and also indicating the circular input key provided in the mid portion of the movable member.

Figure 4D:
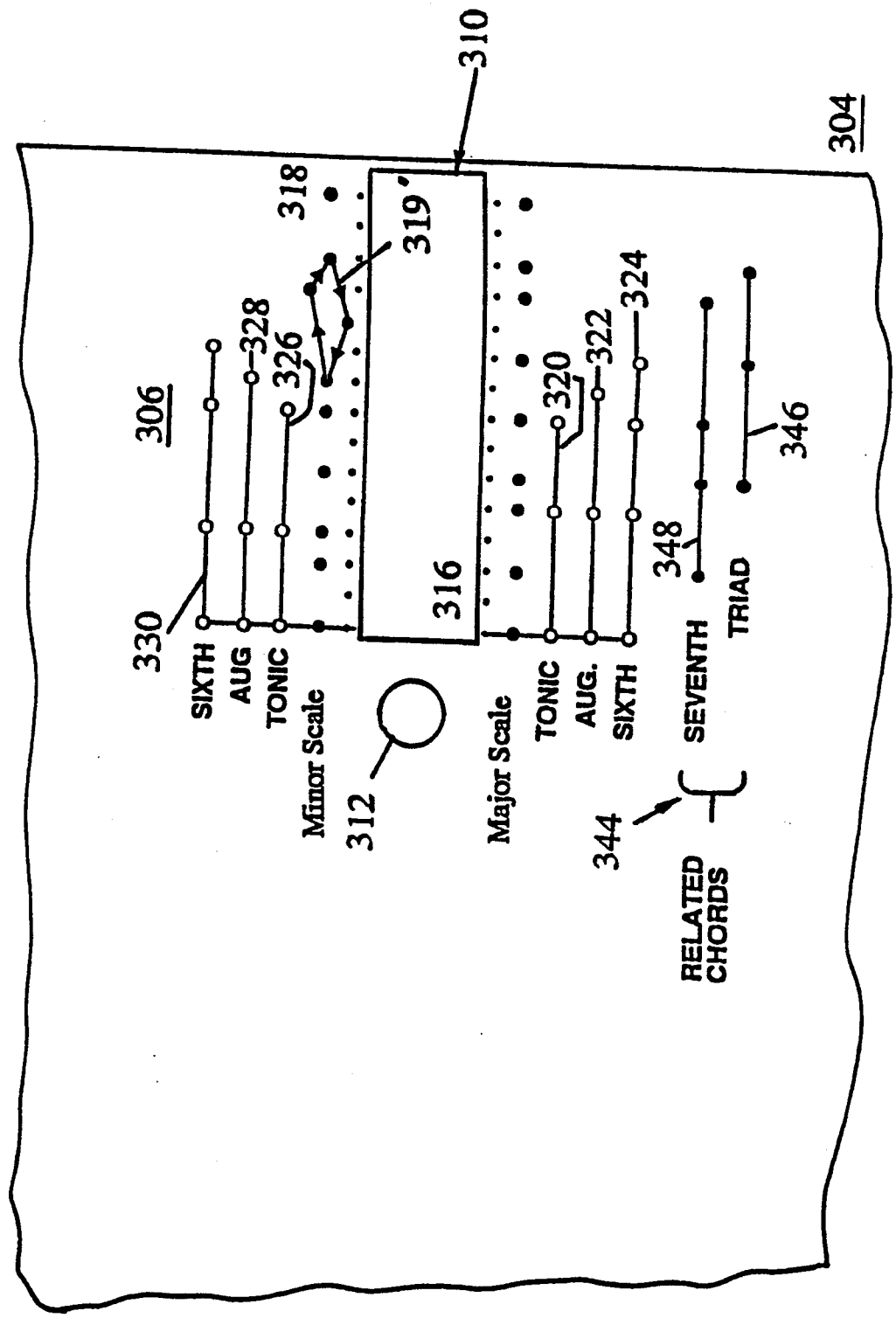

FIG. 4D is a view of the embodiment shown in FIG. 4 illustrating various major and minor scale positions and various chords for the particular key selected.

Figure 4E:
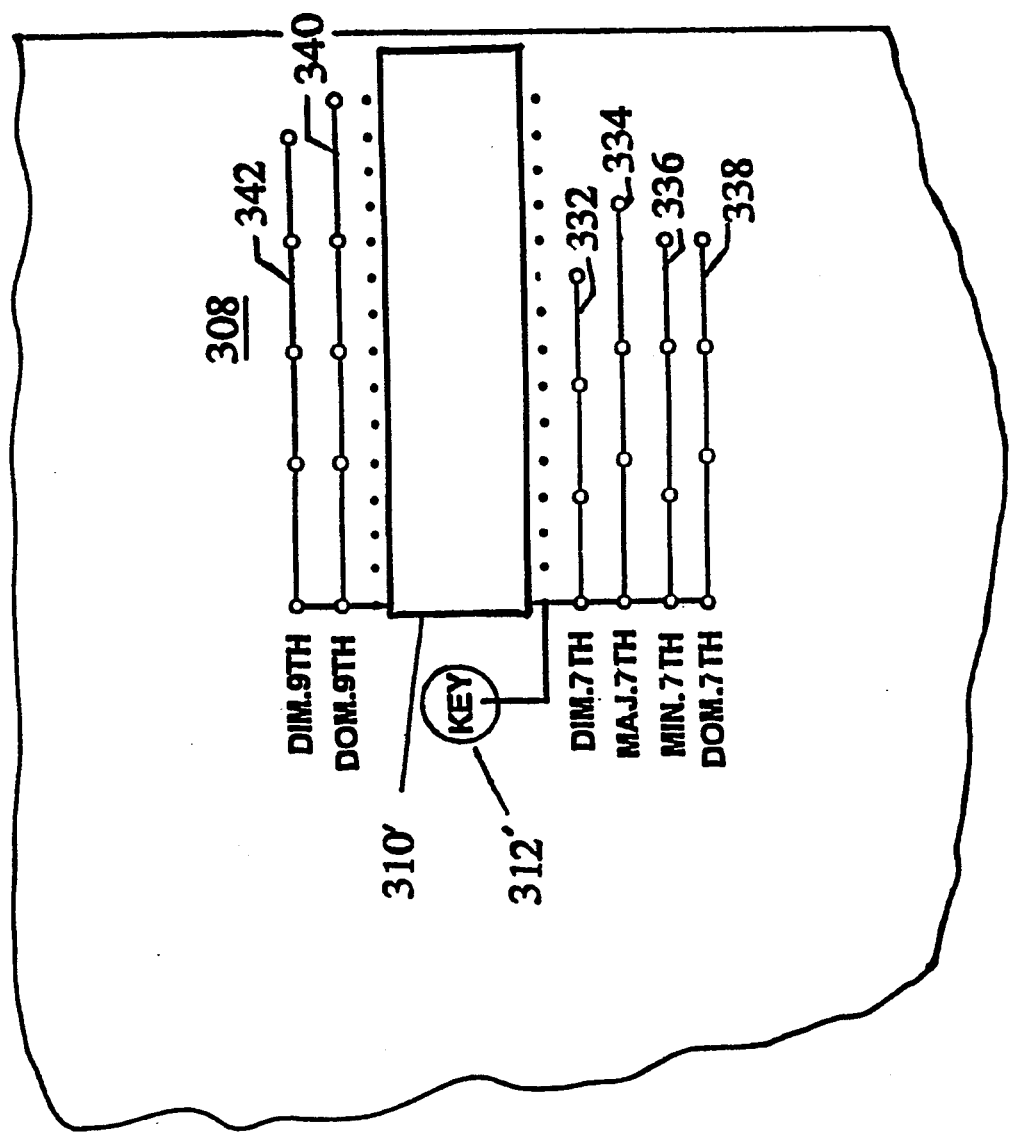

FIG. 4E is a view illustrating the various seventh and ninth chords for the embodiment of the invention shown in FIG. 4.

Figure 5:
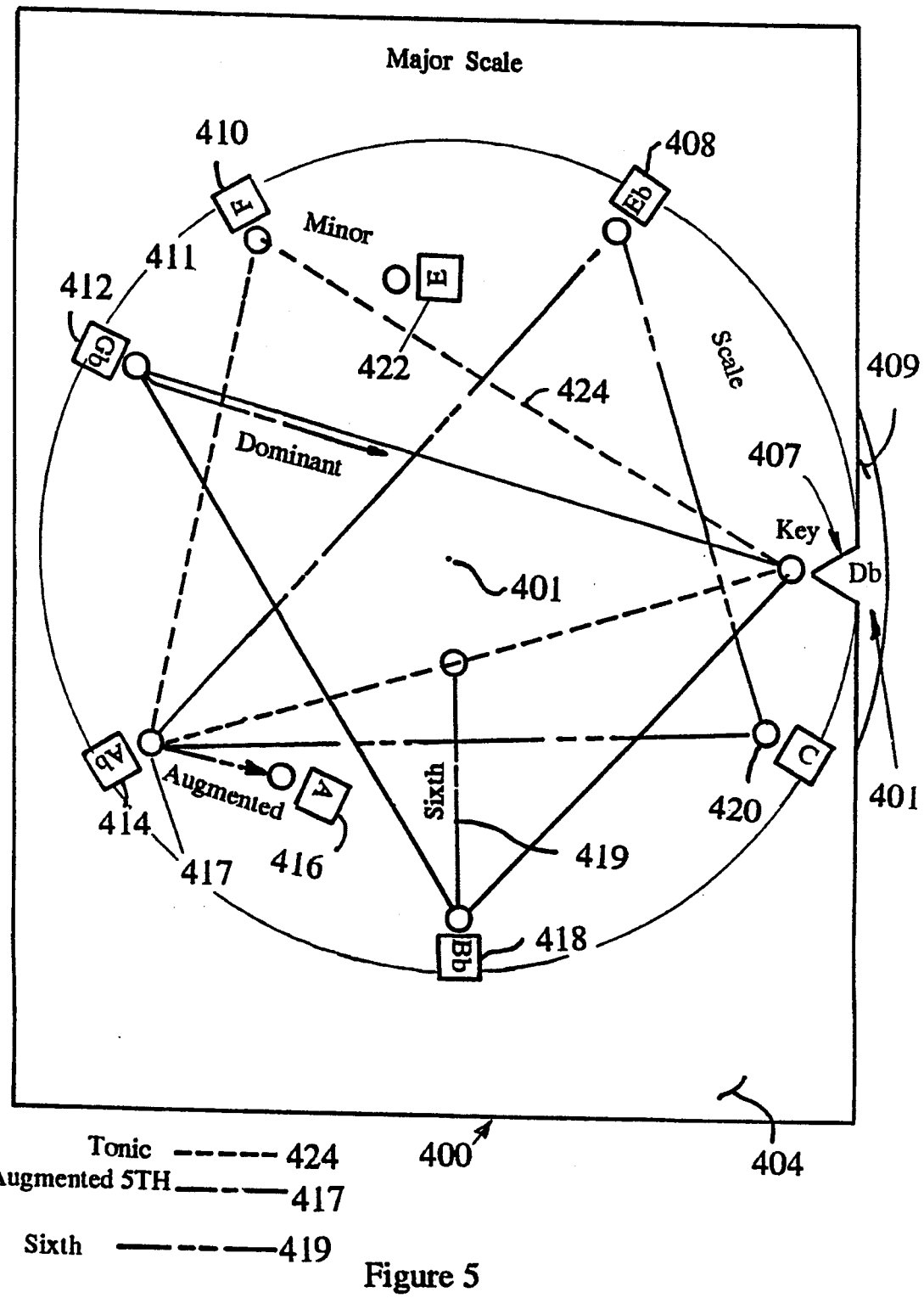

FIG. 5 is a view of another embodiment of the invention wherein the major scale positions are provided on one side of a fixed member, and the minor scale positions are provided on a second side of the fixed member, and wherein a series of openings are provided on the fixed member whereby for a given input key the notes will be viewable through the openings on the fixed member indicating the scale and chord positions for the particular input keys.

Figure 5A:
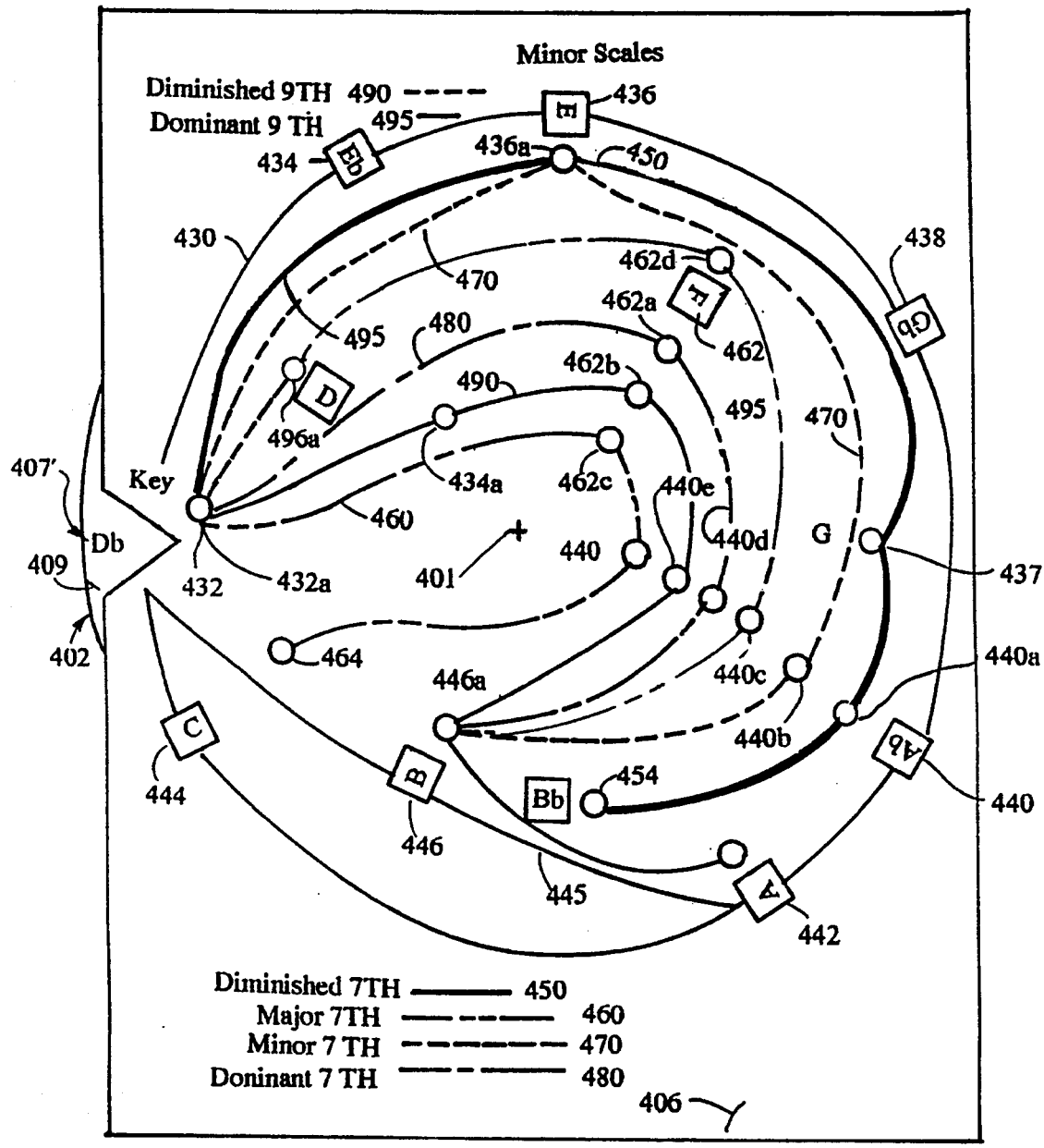

FIG. 5A is a view of the other side of the fixed member including a series of lines corresponding to chords to be determined and also lines for the minor scale. Openings are provided in the fixed member whereby the notes will be viewable through these openings from notes on the movable member located between the two sides of the fixed member. The fixed member in FIG. 5A includes the lines for the seventh chords and the ninth chords.

Figure 5B:
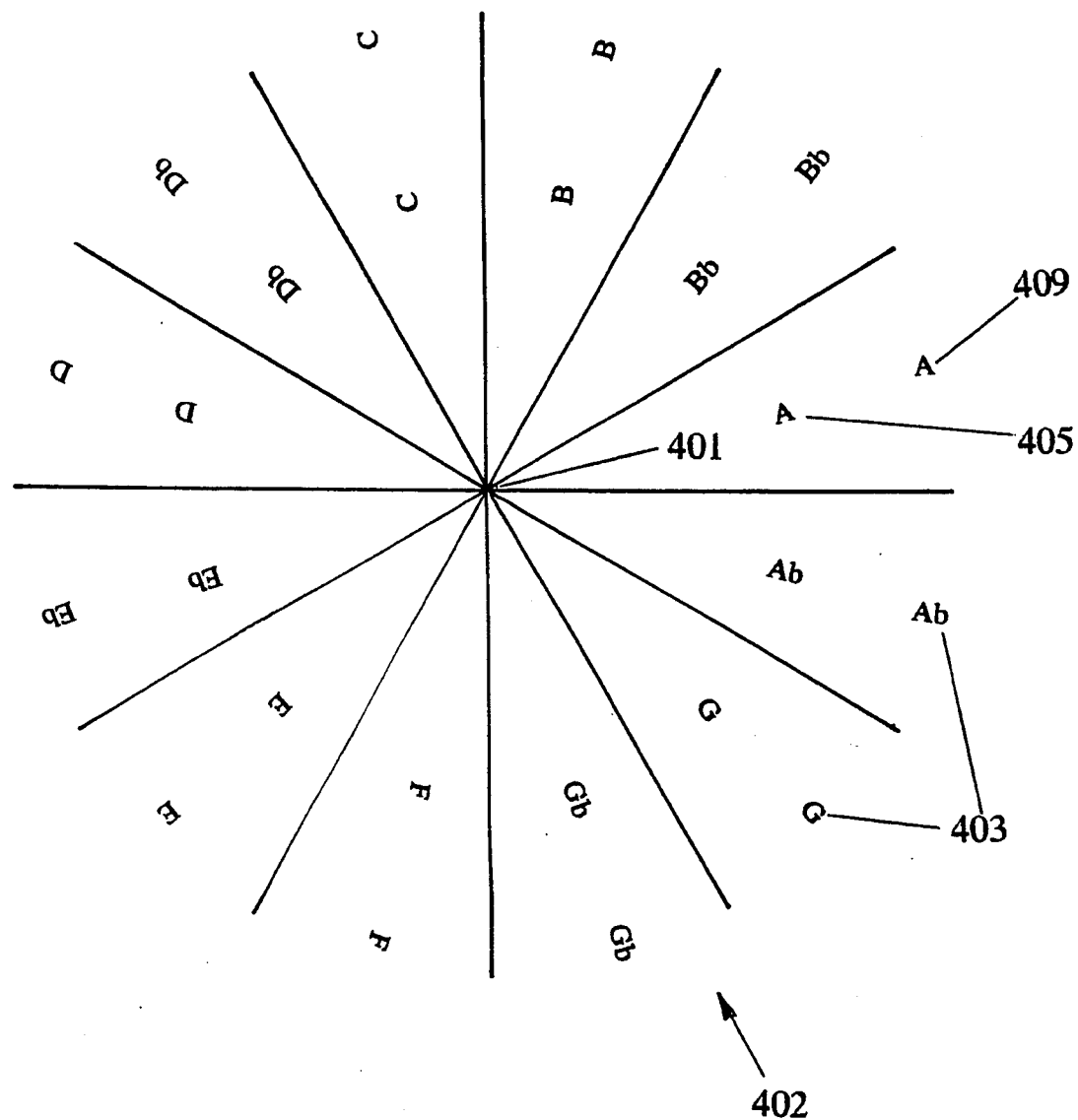

FIG. 5B is a view of the movable member including one side of the movable member and showing the radially extending pie sections corresponding to each note in the ocatve and further including an inner circular ring wherein the input key is provided which is viewable through the openings in the fixed member when the movable member is rotated relative to the fixed member.

Figure 5C:
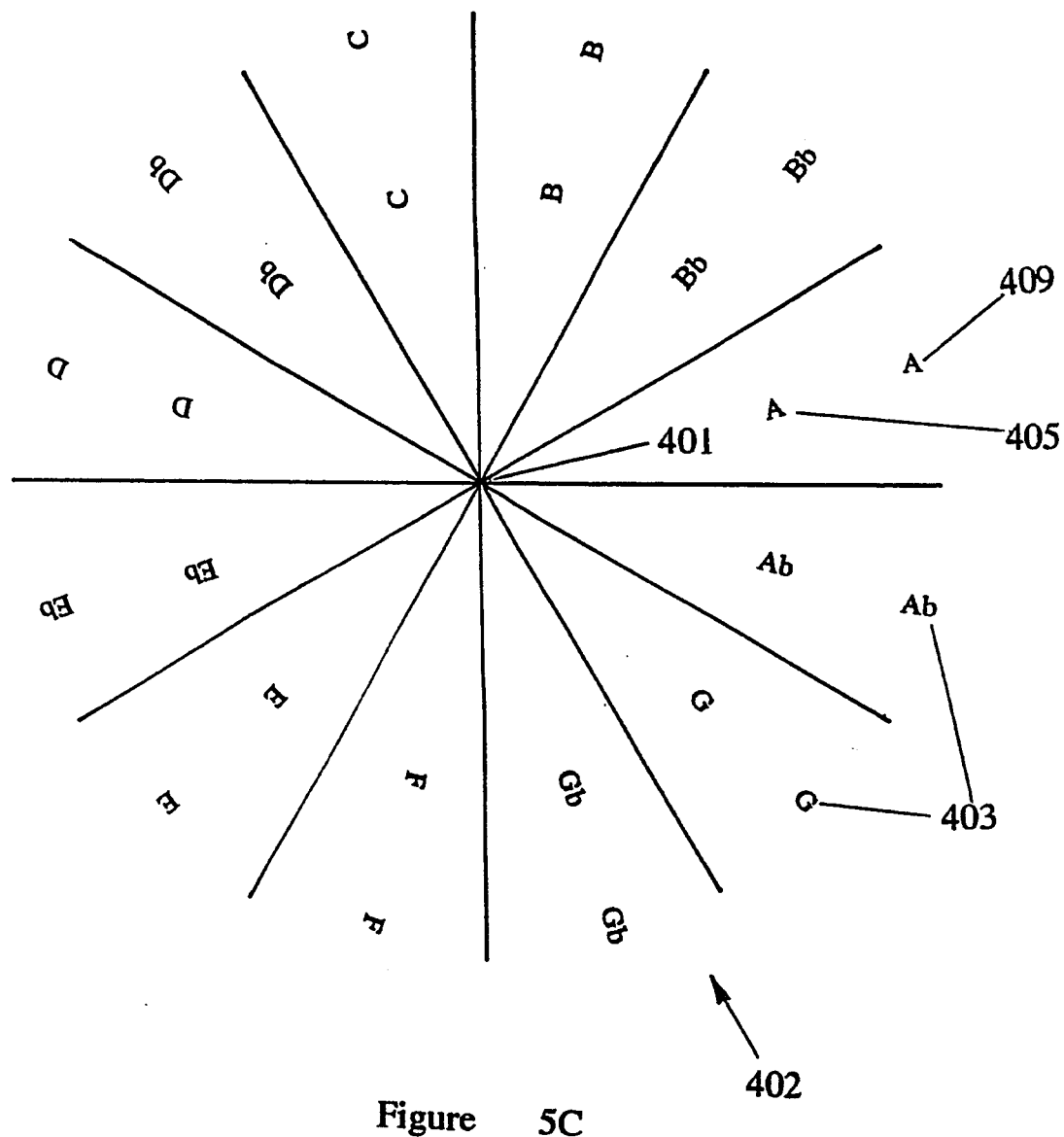

FIG. 5C is a view of the movable member on the second side and showing the radial extending pie sections corresponding to each note in the octave and further including an inner circular ring wherein the input key is provided which is viewable through the openings in the fixed member when the movable member is rotated relative to the fixed member.

Figure 6:
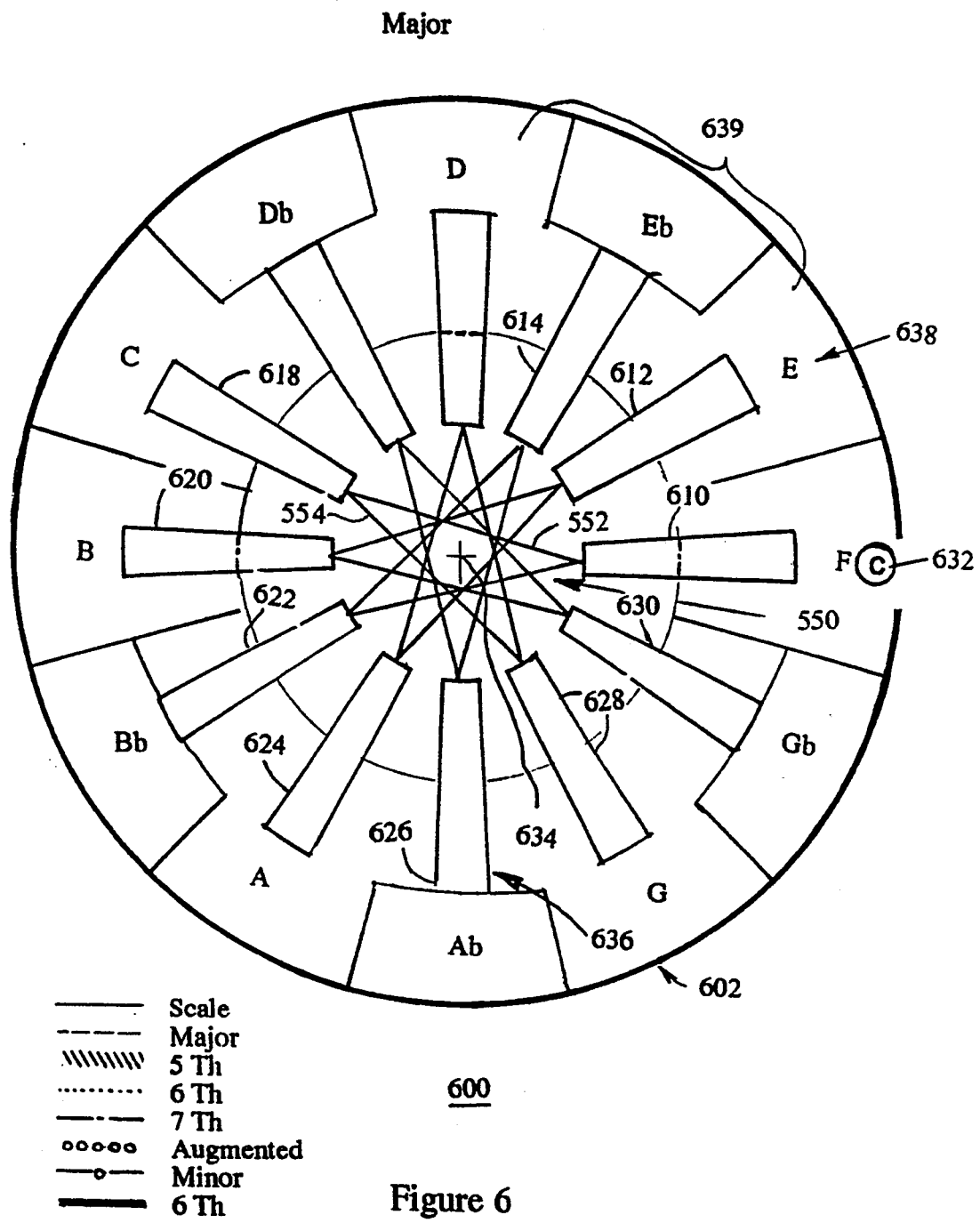

FIG. 6 is a plane view of an embodiment wherein the octave is provided on the fixed member and wherein the scale positions and chord positions are provided on the movable member. Major scale and chord positions are viewable through radially extending slots located in the fixed member.

Figure 6A:
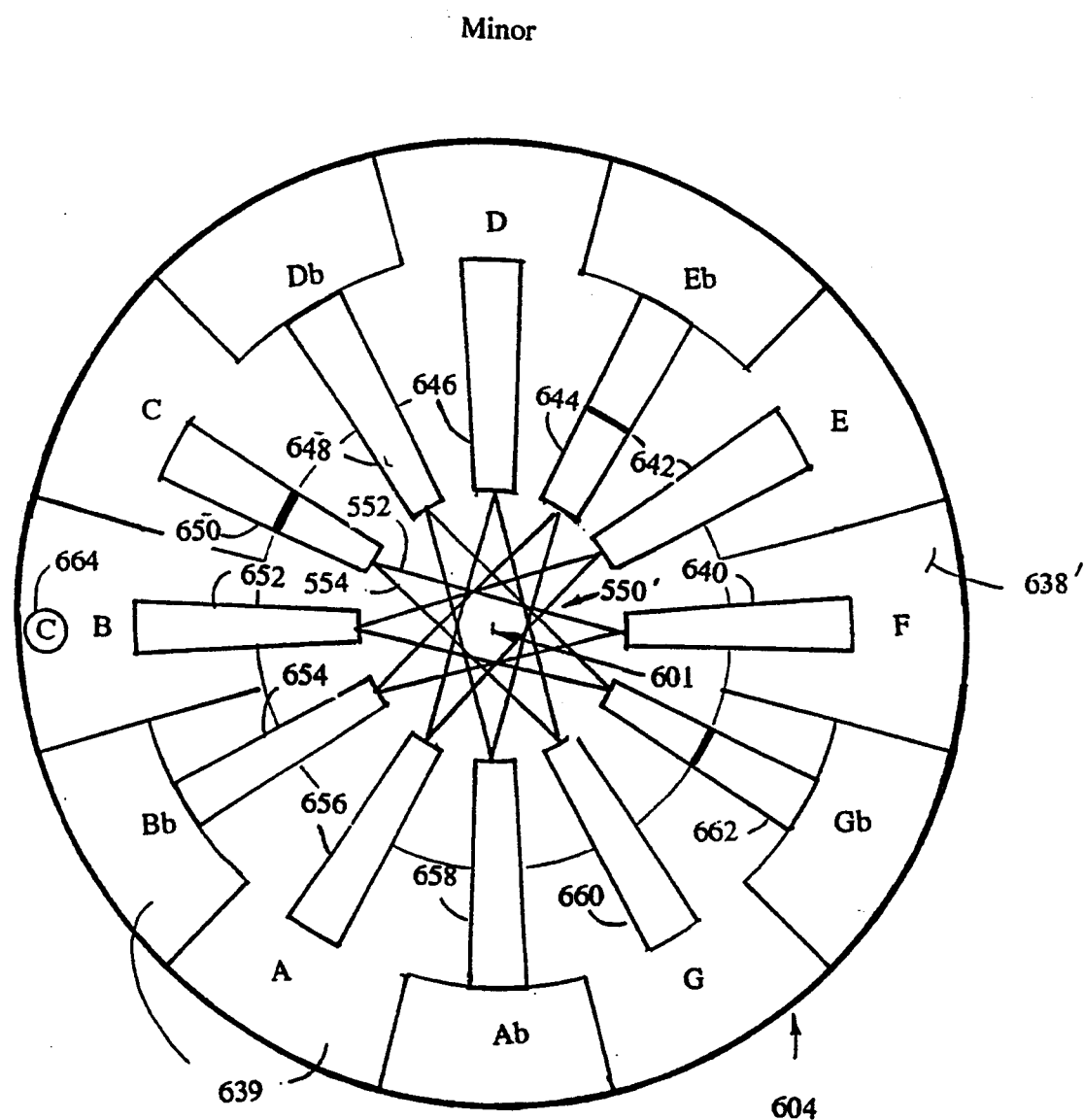

FIG. 6A is a view similar to FIG. 6 illustrating the minor scale positions and seventh and ninth chord positions which are provided on a movable member and which are viewable through slots provided in the fixed member.

Figure 6B:
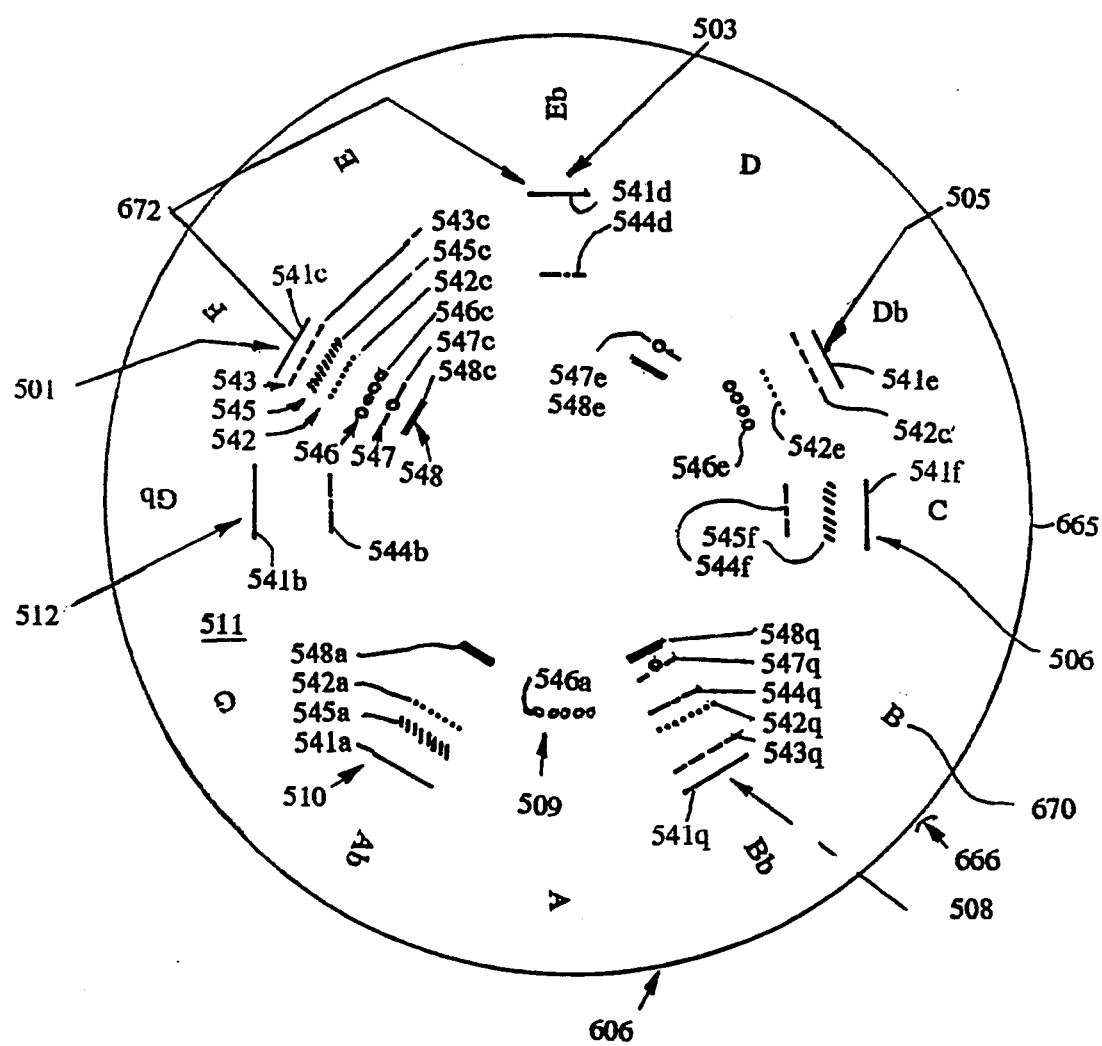

FIG. 6B is a view of the movable member indicating the minor scale and chord positions which are viewable through the slots in FIG. 6.

Figure 6C:
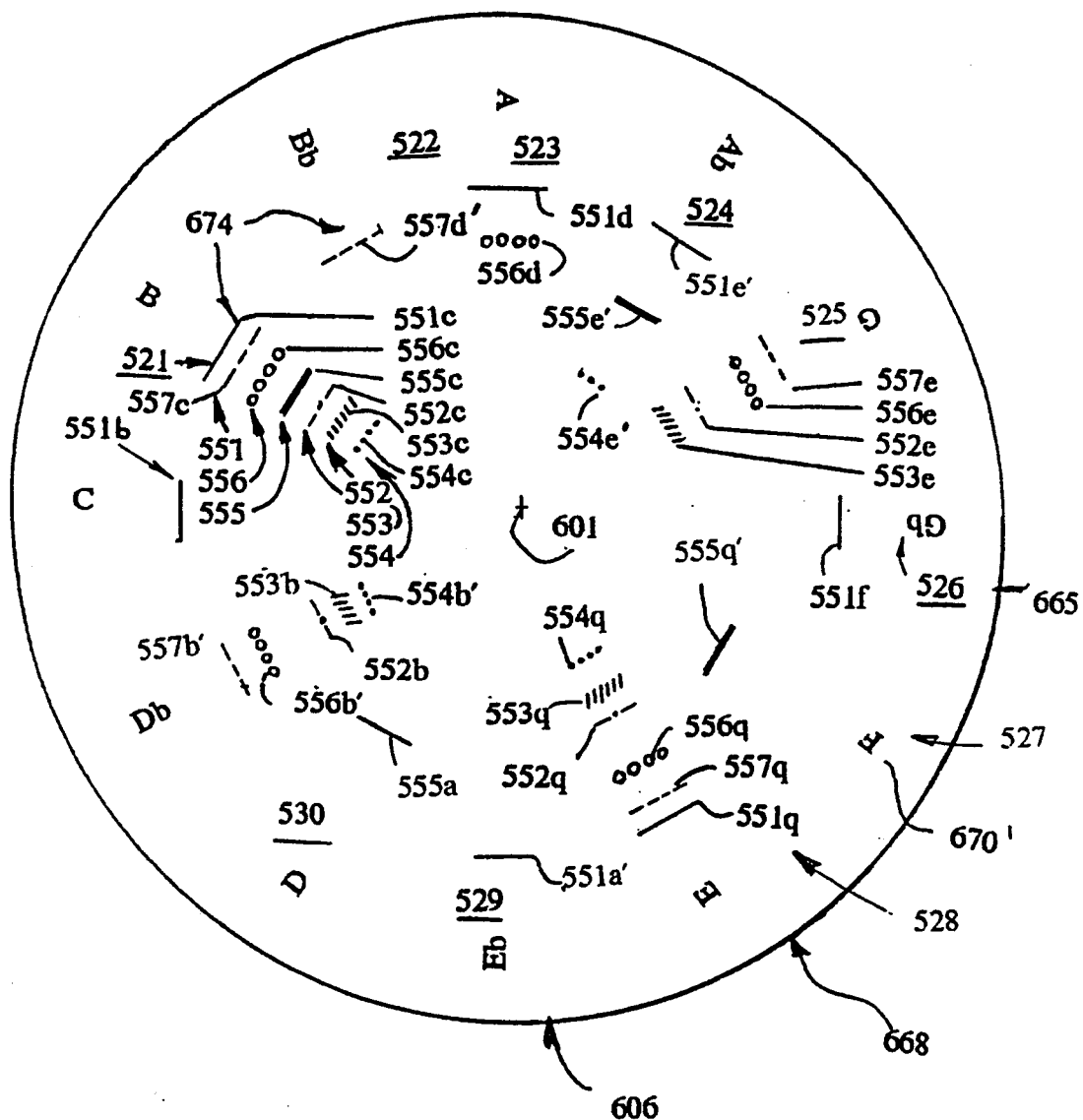

FIG. 6C is a view of the movable member indicating the minor scale and chord positions which are viewable through the slots in FIG. 6A.

Figure 7:
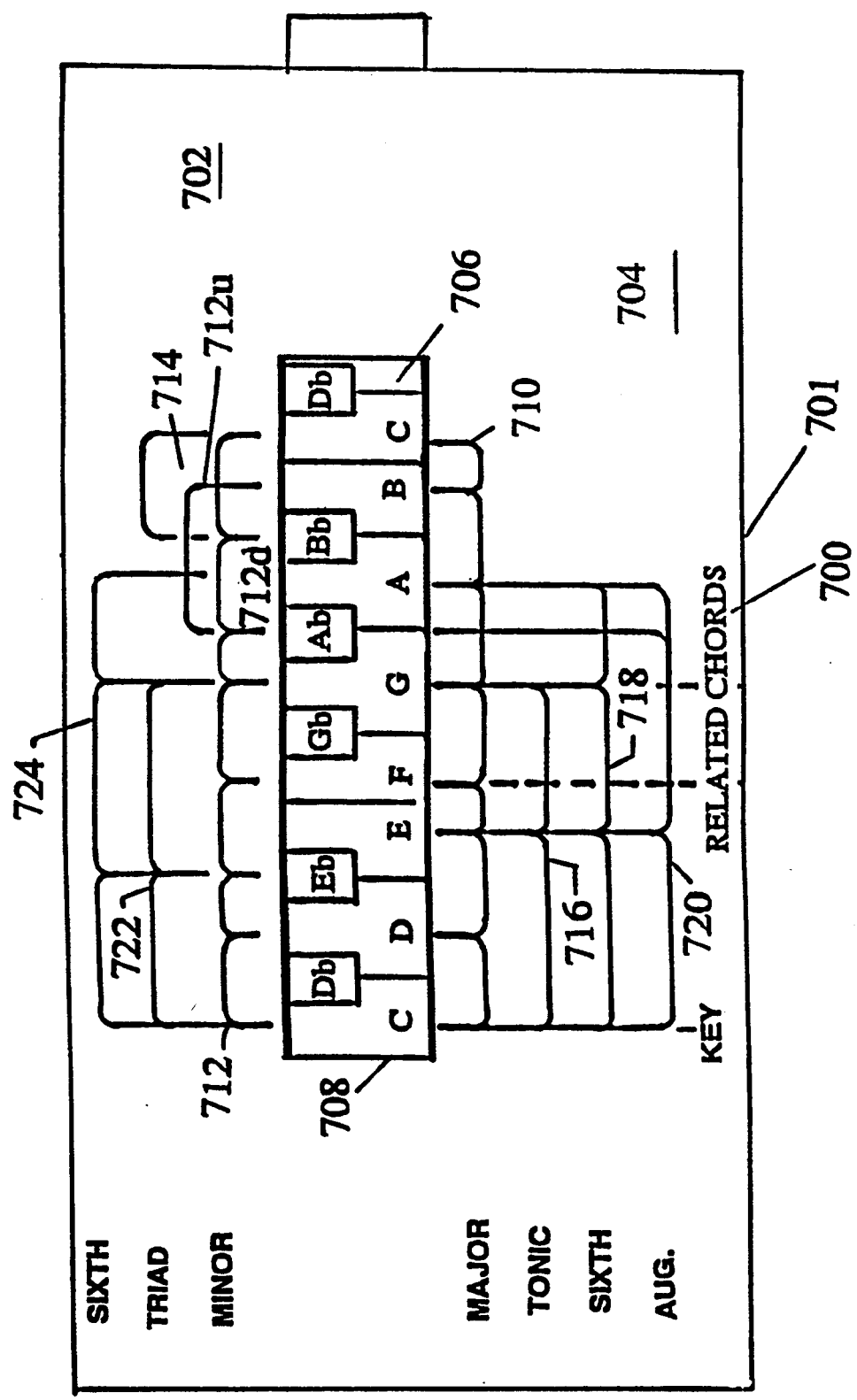

FIG. 7 is a view of another embodiment of the invention and is similar to the embodiment provided in FIGS. 1A through 1D. The chord positions and scale positions are provided on the fixed member and the octave is provided on a movable member which moves laterally with respect to the fixed member.

Figure 7A:
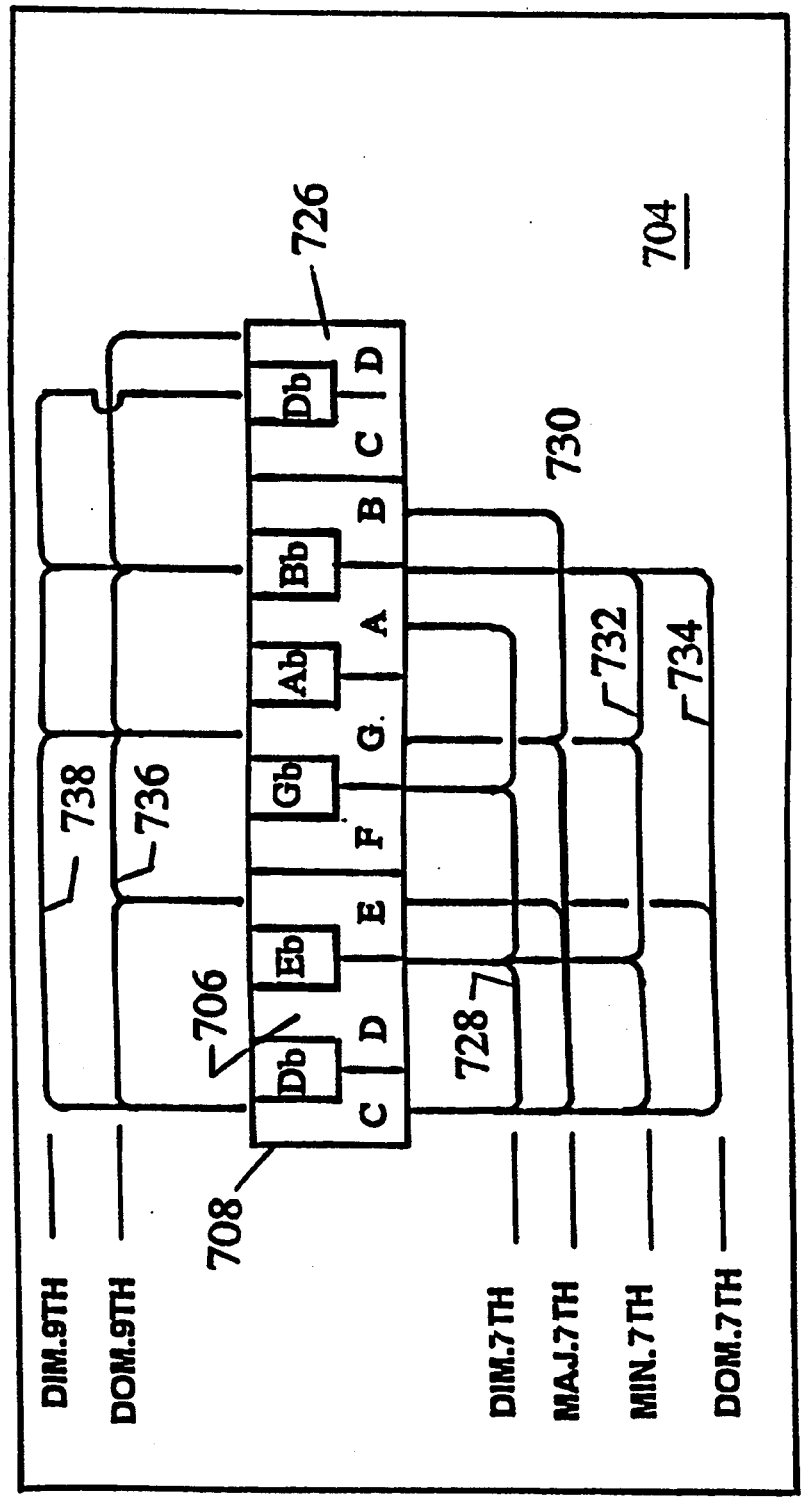

FIG. 7A is a view similar to FIG. 7 illustrating the rear portion of the fixed member and also illustrating the movable member viewable through the opening in the fixed member and indicating the seventh and ninth chord positions.

Figure 7B:
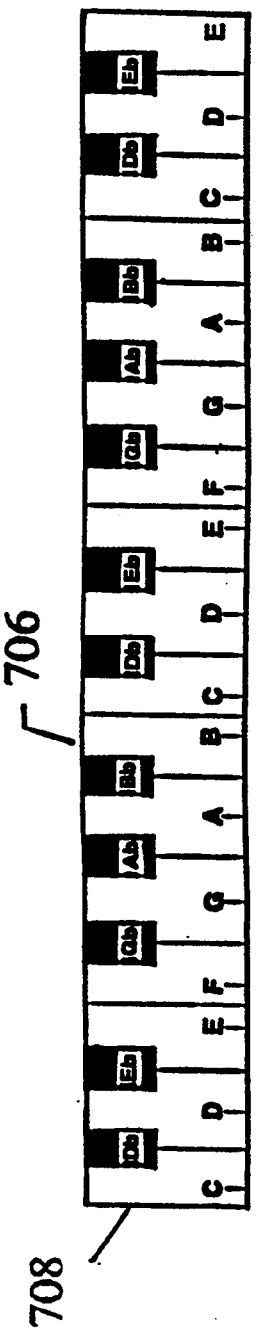

FIG. 7B is a view of the movable member which is utilized on both sides, including the white notes and black notes.

Figure 7C:
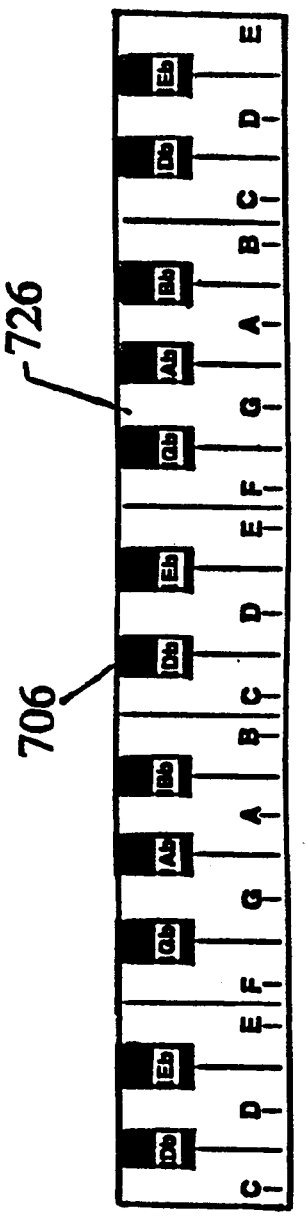

FIG. 7C shows the movable used in FIGS. 7A and 7B.

Figure 8:
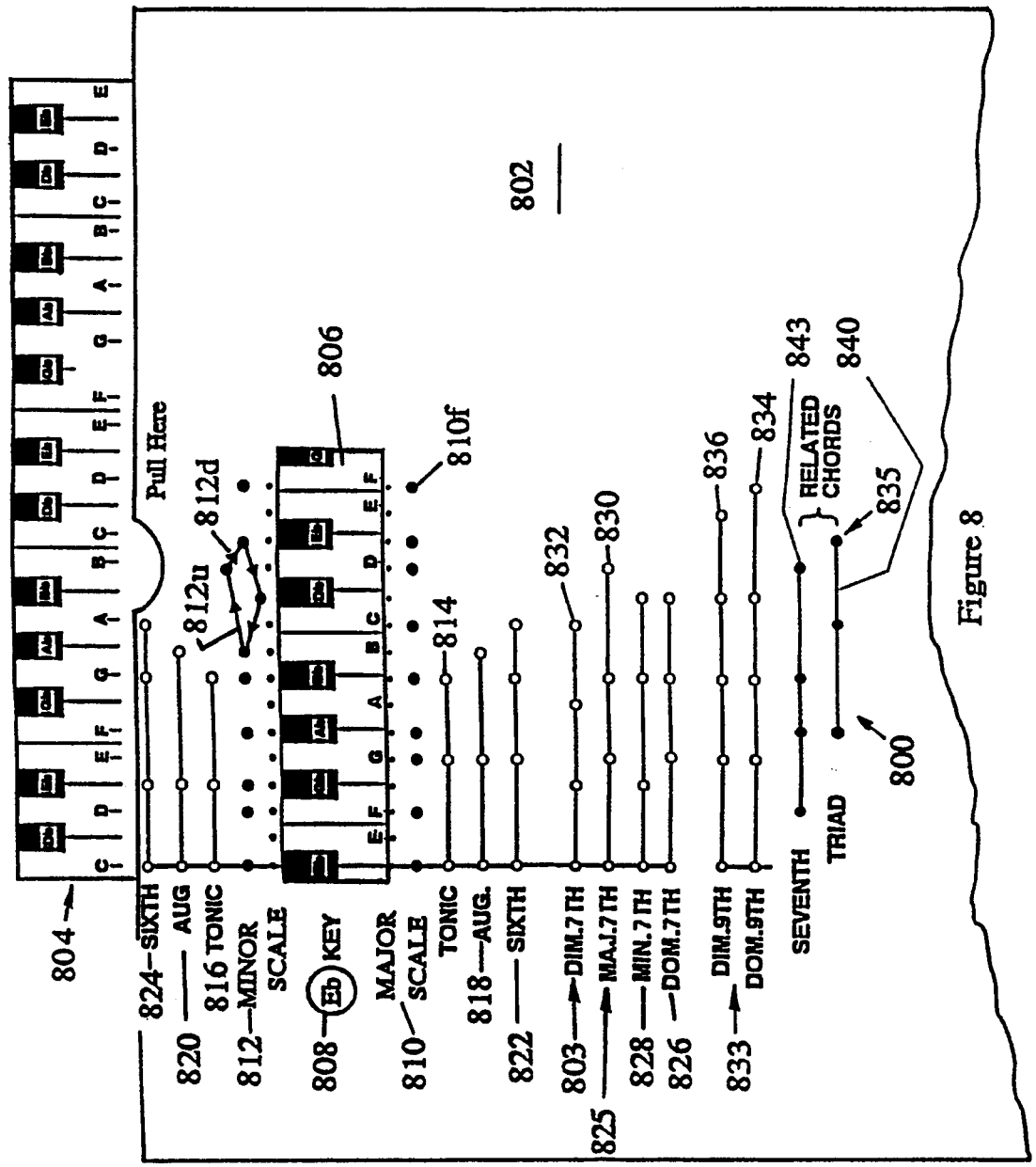

FIG. 8 is a view of another embodiment wherein the scales and chords are provided on the fixed member and an opening is provided in the fixed member wherein the octave is viewable through the opening. In this embodiment the movable member moves vertically relative to the fixed member. All of the major and minor scale positions and all of the chords are provided on the first side of the fixed member.

Figure 8A:
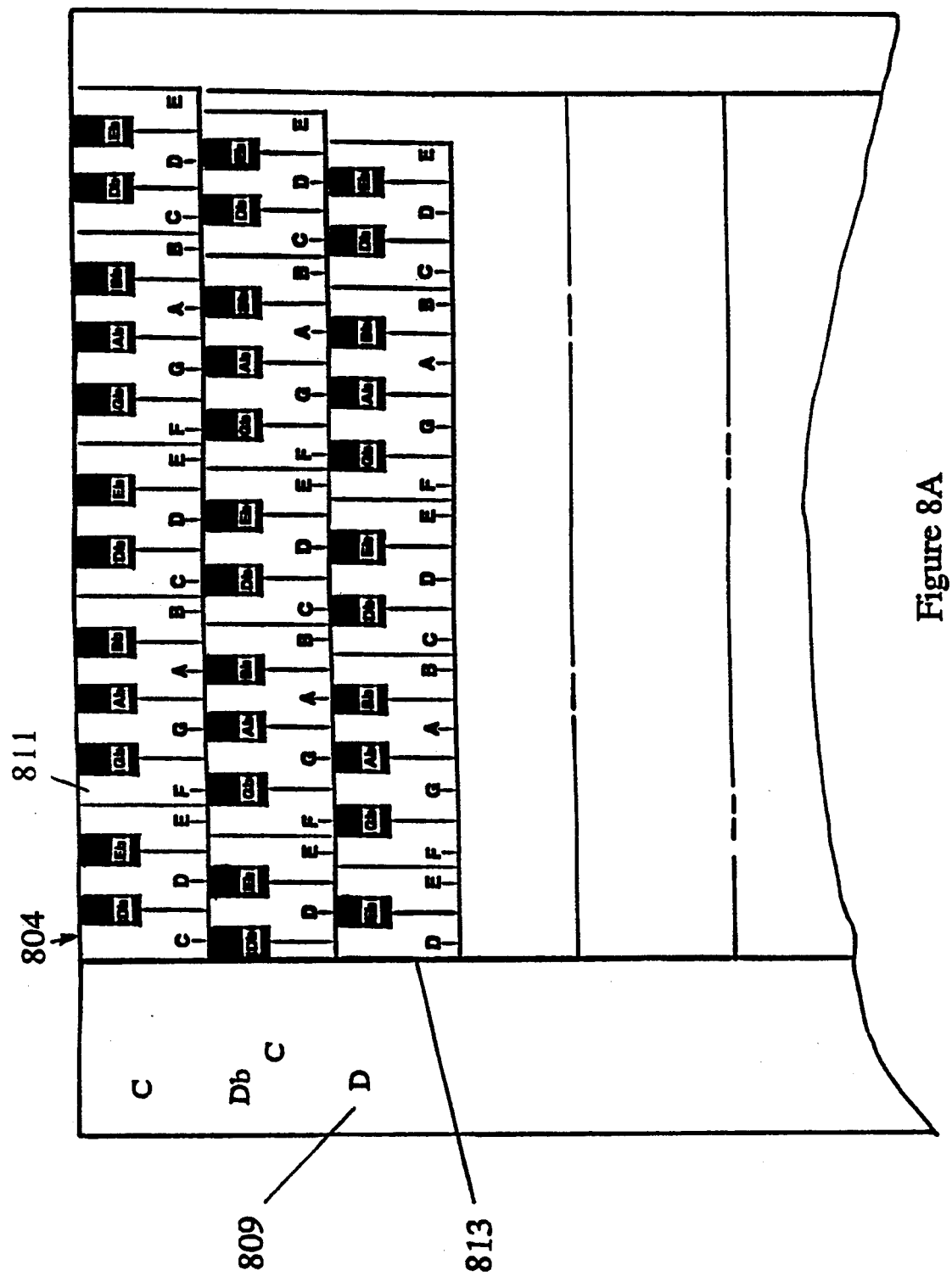

FIG. 8A is a view of the movable member including all of the octaves beginning with a different note and further including another column for the input key. The chord positions for a Given input key are viewable through the opening in the fixed member.

FIG. 8B1 is a view of the top portion of the other side of the movable member including an input key column and a second portion indicating the keyboard positions of both the treble and bass clef of all of the chords for a given key.

FIG. 8B2 is a view of the bottom portion of FIG. 8B1.

Figure 8C:
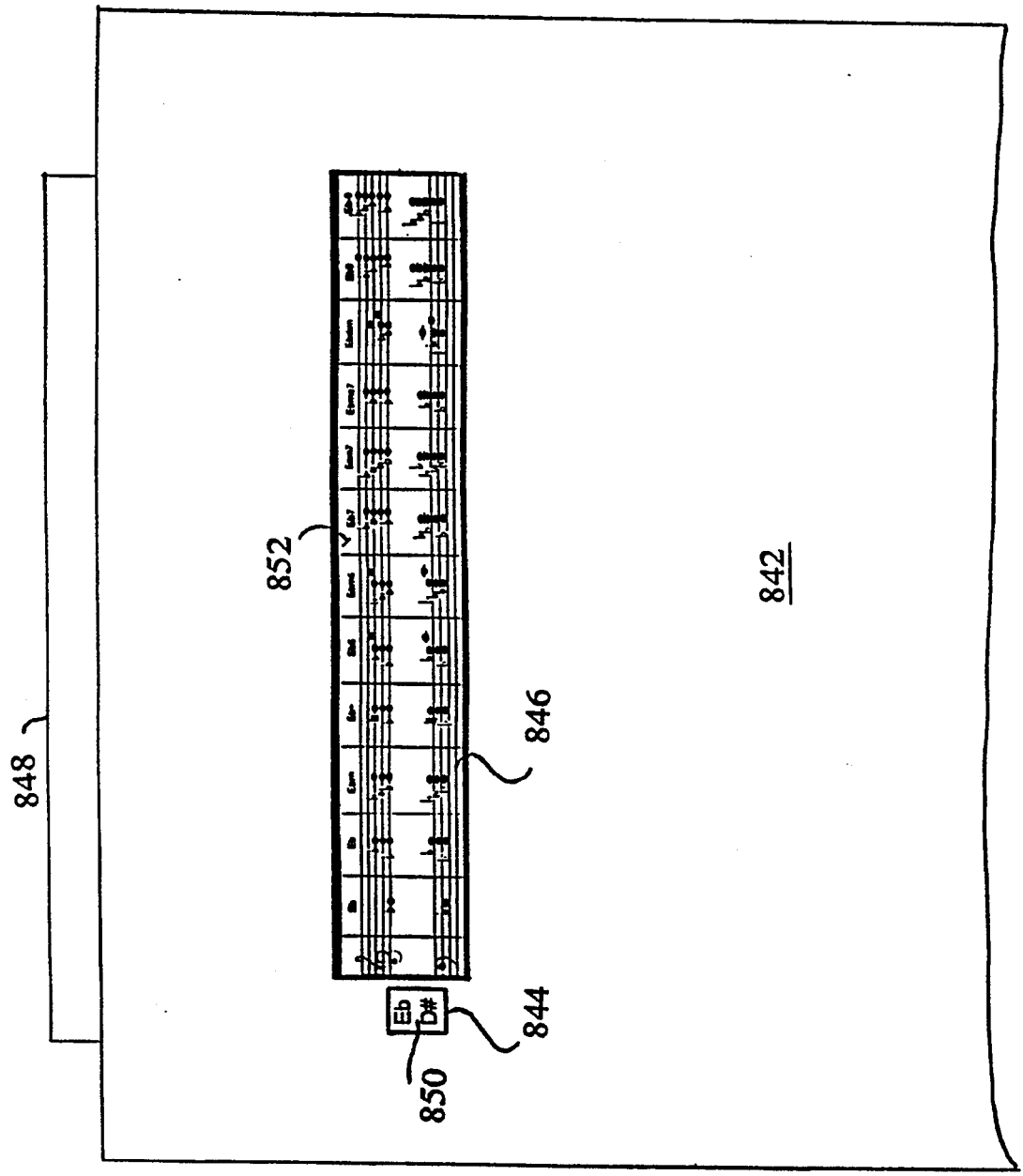

FIG. 8C is a side elevation view of the embodiment of the present invention shown in FIG. 8B1 and 8B2 including the two windows on the second side through which the key, and the the chords on the keyboard may be read for the given key.

Figure 9:
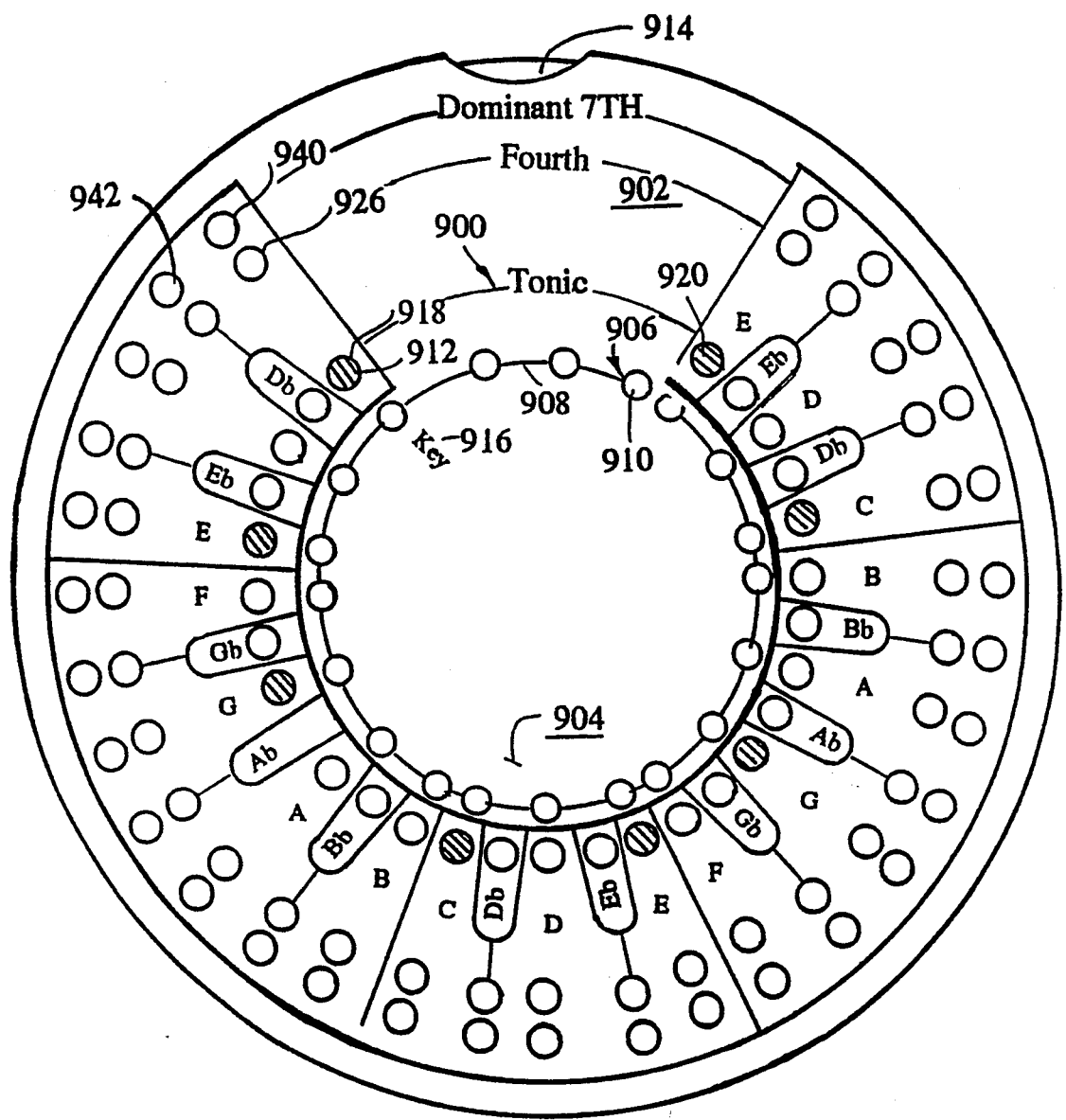

FIG. 9 is a plan view of the another embodiment of the invention wherein the fixed member is generally circular and includes a plurality of openings therein which openings indicate scale and chord positions provided on a movable member.

Figure 9A:
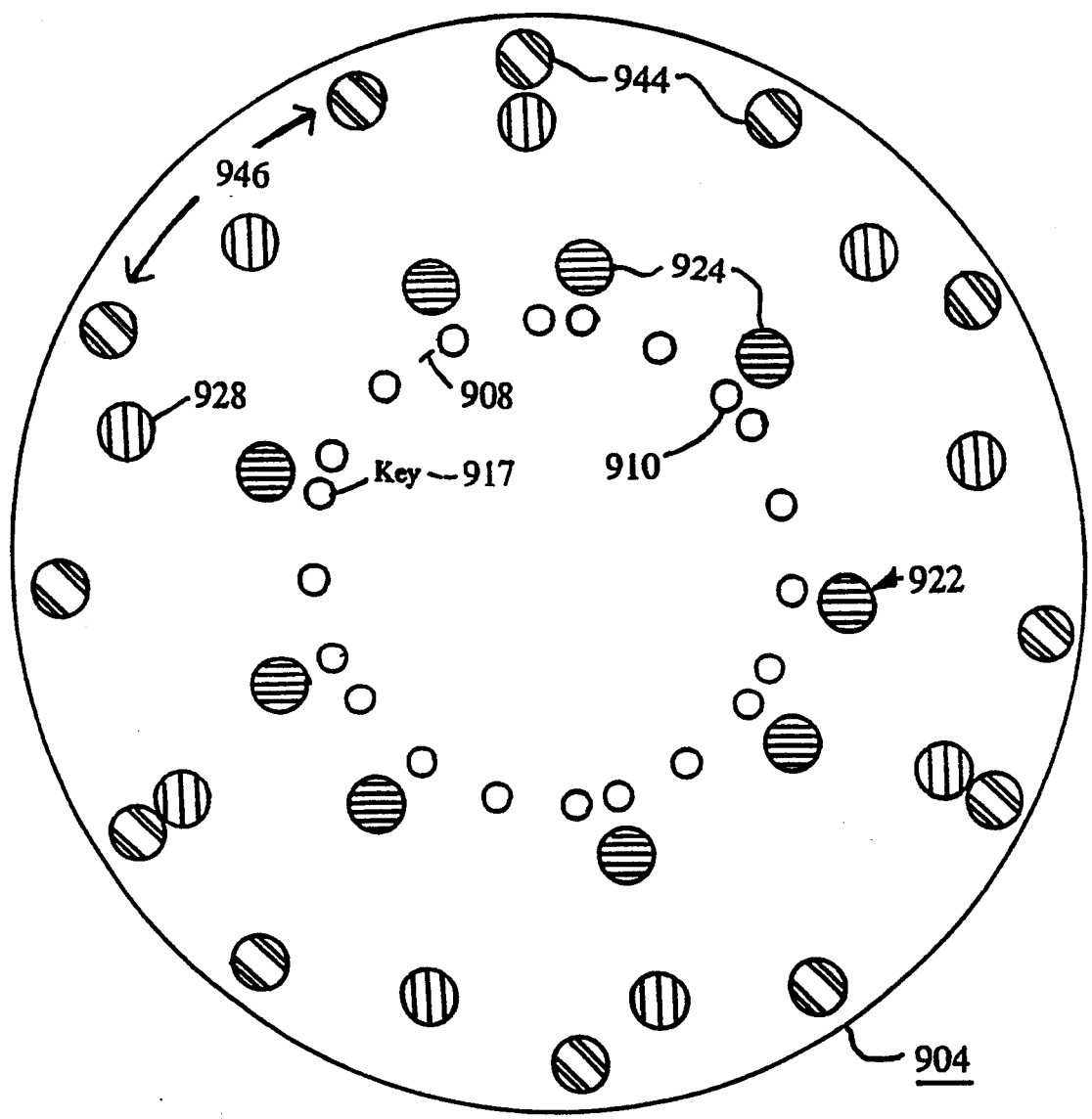

FIG. 9A is view of the movable member to be used in connection with FIG. 9 including a series of dots whereby when the movable member is rotated relative to fixed member shown in FIG. 9, the scale and chord positions can be read through the openings in FIG. 9.

DESCRIPTION OF PREFERRED EMBODIMENTS

Most musical instruments deal with linear increments between chromatic scale notes. Piano keys and fretted stringed instruments are examples of this.

This invention addresses the linear, uniform spacing of the notes of the chromatic scale and illustrates them on a fixed or moving member. Because of the cyclic nature of notes repeating in successive octaves it is also possible to make the spatial positions in a circular form. The invention therefore deals with two forms: linear and circular.

Although mostly keyboard embodiments are disclosed, the concepts are generic and therefore applicable to any instrument.

FIGS. 1A–1D illustrate the basic music slide rule embodiment 10. It is comprised of a fixed member 12 and a moving member 14. A window 16 to view the moving member 14 is made in the fixed member 12. The fixed member 12 contains on two surfaces, front 18 and rear 20, the spatially positioned relationships for all musical chords and scales. Rear surface 20 also includes a window 17, and movable member 14 includes a first and second side 15, 15', having scales 30, 30' thereon.

The input key 22 on the fixed member 14 is located between the two shaded dots 24 & 26 on the left of side 18. Desired information including major and minor scales and chords for the input key, appears in the window 16 by vertical alignment between the fixed member 12 and movable member 14 on the selected side 18 or 20. FIG. 1C shows the movable member 14 on side 15 including white notes 28, and black notes 33. FIG. 1D shows side 15' of movable member 14, including white notes 28 and black notes 33.

The reason why this arrangement works is that white notes 28 on the movable member keyboard scale 30 are not of uniform width. White notes D, G and A are larger by a factor of about 1.5 than white notes E, F, B and C to maintain a fixed interval space 32 in the planer domain of the movable member 14. In other words, black notes 33 occupy the same amount of transverse space as do the white notes surrounding them. But since there are no black notes between E and F, and B and C, no black notes share the transverse space between these notes, and the transverse space occupied by E, F, B, and C is less. Thus each of the notes D, G, and A are larger because, in addition to their own unit length, they must include one half of the length of two adjacent black notes. Thus notes D, G, and A are about 1.5 times larger in transverse extent than notes B, C, E, and F.

In using the slide rules chord ruler embodiment 10, with C as the input key at 22, it will be apparent that the tonic chord C, E and G may be read from side 18 on line 34. The augmented chord C, E and A flat may be read from line 36. The sixth chord C, E, G and A may be read from line 38.

The major scale may be read from openings 39 in fixed member 12 on side 18, on the shaded line 40 below window 16; C, D, E, F, G, A, B, and C, and in the next octave, D. The scale circular dots 41 are provided on movable member 14 FIG. 1C. The minor scale may be read above window 16 on line 42, including C, D, E flat 44, F, G natural, and A flat. There is also included the harmonic minor along line 46 including B natural, and the natural minor, including B flat, along line 48.

The minor tonic including C, E flat and G is shown along the line 50. The augmented minor, including C, E flat and A flat is shown at 52. The minor sixth including C, E flat, G natural and A natural is shown on line 54.

On the other side 20 (FIG. 1B) the dominant seventh is shown on Line 56 including C, E, G, and B flat. The minor seventh is shown on Line 58 including C, E flat, G, and B flat. The major seventh is shown on Line 60 including C, E, G and B natural. The diminished seventh is shown on Line 62 including C, E flat, G flat, and A.

The dominant ninth is shown on Line 64 which is very commonly used in jazz work including C, E, G, B flat and D natural. The diminished ninth or flatted ninth is shown on Line 66 and differs from the dominant ninth in that the D is flatted. This is a very pretty chord and is frequently used in jazz ballads.

Returning to the first side 18, related chords for the input key of C indicated at 22 are found in Section 70. The sub-dominant or fourth chord, or in the input key of C, the F chord is indicated on Line 72 including the notes of the F major chord, F, A, and C. The dominant seventh of the input key C is shown on Line 74. This G seventh chord is illustrated in an inverted form including D, F, G, and B.

It will thus be apparent that this embodiment includes the major scale at 40, both minor scales at 42, all of the basic chords for the input key on the first side 18, and including on the reverse side 20, the major seventh, minor seventh and flatted ninths which are used extensively in modern jazz. The same information is obtained when a different key is inputed into the position 22 in the windows 16 and 17.

FIGS. 2-2B illustrate another embodiment of the present invention 140. This embodiment comprises a pendant 142 to hang around a child's neck while practicing or taking his or her lesson. A partially transparent movable member 146 is rotatably mounted on a fixed member 144 with a mechanical fastener 147 generally in the mid portion thereof.

FIG. 2A shows the circular, movable member 146. FIG. 2B shows the fixed member 144.

FIG. 2A includes one octave of the scale radially oriented at 148, including white notes 150, C, D, E, F, G, A, and B, and black notes 152, located radially outwardly from white notes 150. White notes D, G, and A occupy a greater radial extent or pie portion than do notes C, B, E, and F, by a radial extent or pie portion of about 1.5. Radial lines 151 and 153 define the notes.

In the mid portion 154, a series of related chord lines 156 are provided from each of the notes 150 and 152 to a pair of related chords, to the sub-dominant and the dominant seventh chord of the key where the line originates. For example, a sub-dominant chord line 158 extends from C to F, and a dominant seventh line 160 extends from C to G. It is to be noted, however, that the sub-dominant line 158 for C is, in reverse direction, the dominant seventh line 160 for F. And, the dominant seventh line 160 for C is, in reverse, the sub-dominant line 158 for G.

On the fixed member 144, as shown in FIG. 2B, a series of radial alignment lines 164 are provided. A related chord line 162 including projection for the sub-dominant chord 166 and for the dominant seventh 168 are provided.

A keyboard is shown on the fixed member 144 at 170. The keyboard enables the student to translate the information readable from FIG. 2 to a keyboard instrument such as a piano or an organ.

For a selected input key, with lines 164 and 151 and 153 aligned, for example C, at position 148, the major scale may be read clockwise from the line 149 on the fixed member 144. The sub-dominant and dominant seventh chords may be read from respective lines 158 and 160, and related chord line 162. Lines 149, 158, 160, and 162 are preferably provided in contrasting colors for increased clarity.

FIGS. 3-3E show another embodiment 260 with a fixed member 262 with major scales positions 263 on one side 264, and minor scale positions 265 on the other side 266. There are four moveable members 268, 270, 272 and 274 rotably mounted at 276.

Movable members 268 and 272 are rotatable about fastener 276 to place the various keys in position relative to minor and major scale positions on the respective fixed member sides 266 and 264. Smaller rotatable members 274 and 270 provide chords.

If on the major scale side 264 of fixed member 262 the moveable member 272 is moved to the key position 280 on the fixed member 262, for example, if the key of C on the moveable member 272 is moved to the key position 280, the major scale may be read clockwise C, D, E, F, G, A, and B by following the indicator lobes 282.

Also, on this side, if the moveable member 274 is rotated to the key position 284, aligned with the key position 280 on the movable member 272, the minor third chord may be read on line 286, the major third chord on line 288, the sub-dominant chord, F, the fourth in the key of C, may be read on line 291, and the dominant 7th chord may be read on line 292.

The augmented chord of C, E, and A flat may be read from lines 288, 293 and 295. The sixth chord can be read on lines 297, 294 and 296.

The same information can be obtained for all keys by appropriate rotation of the movable member 272 to the key position 280 on fixed member 262.

On the other side of the device (FIG. 3A) the minor scales may be read by following the lobes 298 from the key position 202 on the fixed member 266, by locating the key member 204 on rotatable member 268 to position 202 on fixed member 266. Following the lobes 298 reveals the C minor scale of C, D, D sharp, F, G, G sharp, A sharp and B on line 298A on the way up and G sharp and A sharp on the way down to include both minor scales.

Also on this minor scales side 266 the diminished seventh may be read from positions 206 and 208 and 210, C, D sharp, F sharp, and A along line 211.

The major seventh may be read from positions 212, 214 and 216, in the case of the key of C, C, E, G, and B along line 217. Minor sevenths may be read from following the line 220 first from C to the position 206 indication D sharp then to the position 214 indicating F and then to the position 215 indicating A sharp or B flat. The dominant seventh chord may be read from following the line 222 including the position 212 indicating E, the position 214 indicating G, the position 215 indicating A sharp or B flat, the position 201 indicating C.

In this embodiment it is preferred to provide the lines indicating the major third, minor third, and related chord lines in different colors so that these lines clearly stand out and contrast relative to each other.

Similarly on the minor scale side the lines for the minor seventh, the major seventh are properly provided in contrasting colors for ease of following the respective line.

It is also to be noted that the dominant ninth can be read from line 224 indicating in the case of the key of C, D natural and in the case of the diminished ninth, the note of C sharp or D flat by following line 226.

Figure 1A:
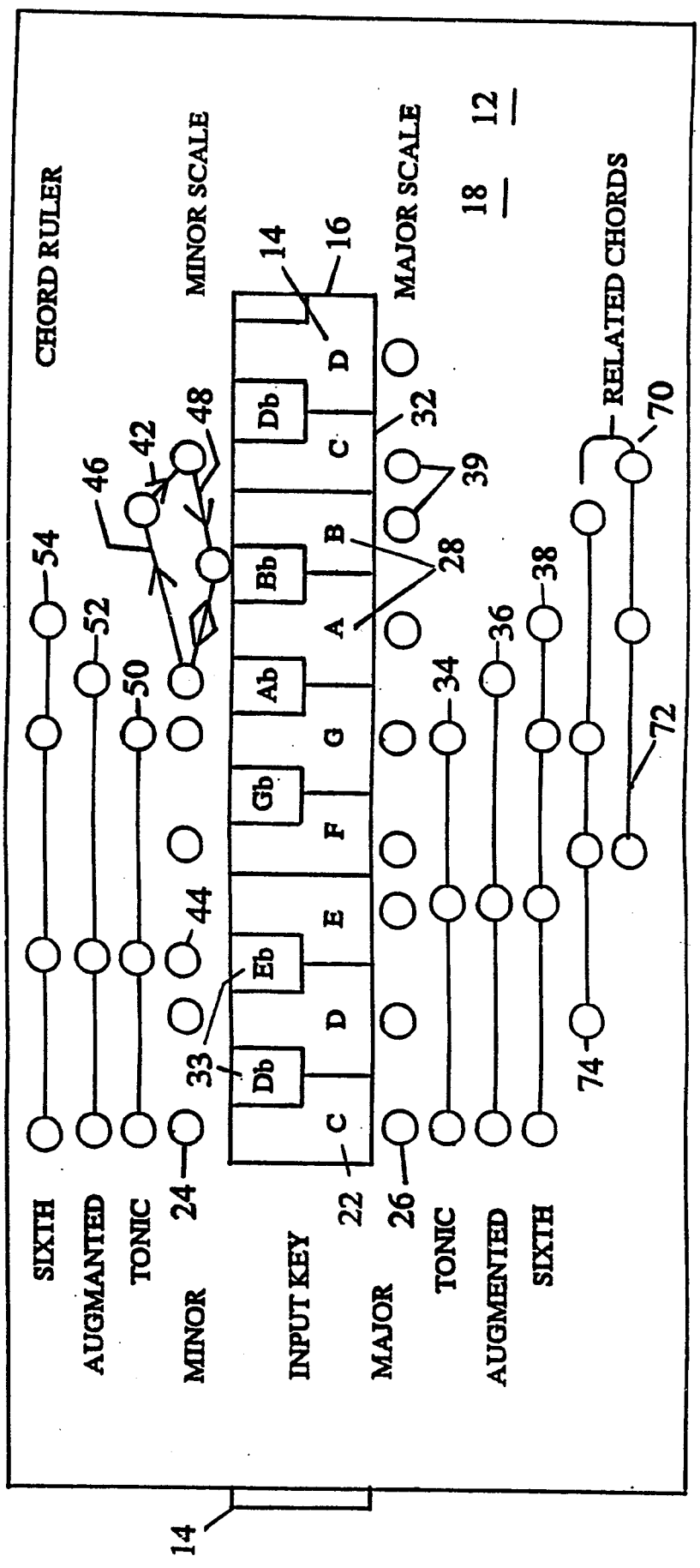
FIG. 1A is a plan view of a linear device in which the chord positions are provided on the fixed member, the scale positions are provided on the fixed member, the octave is provided on the movable member, and the movable member is movable laterally with respect to the fixed member.
Figure 1B:
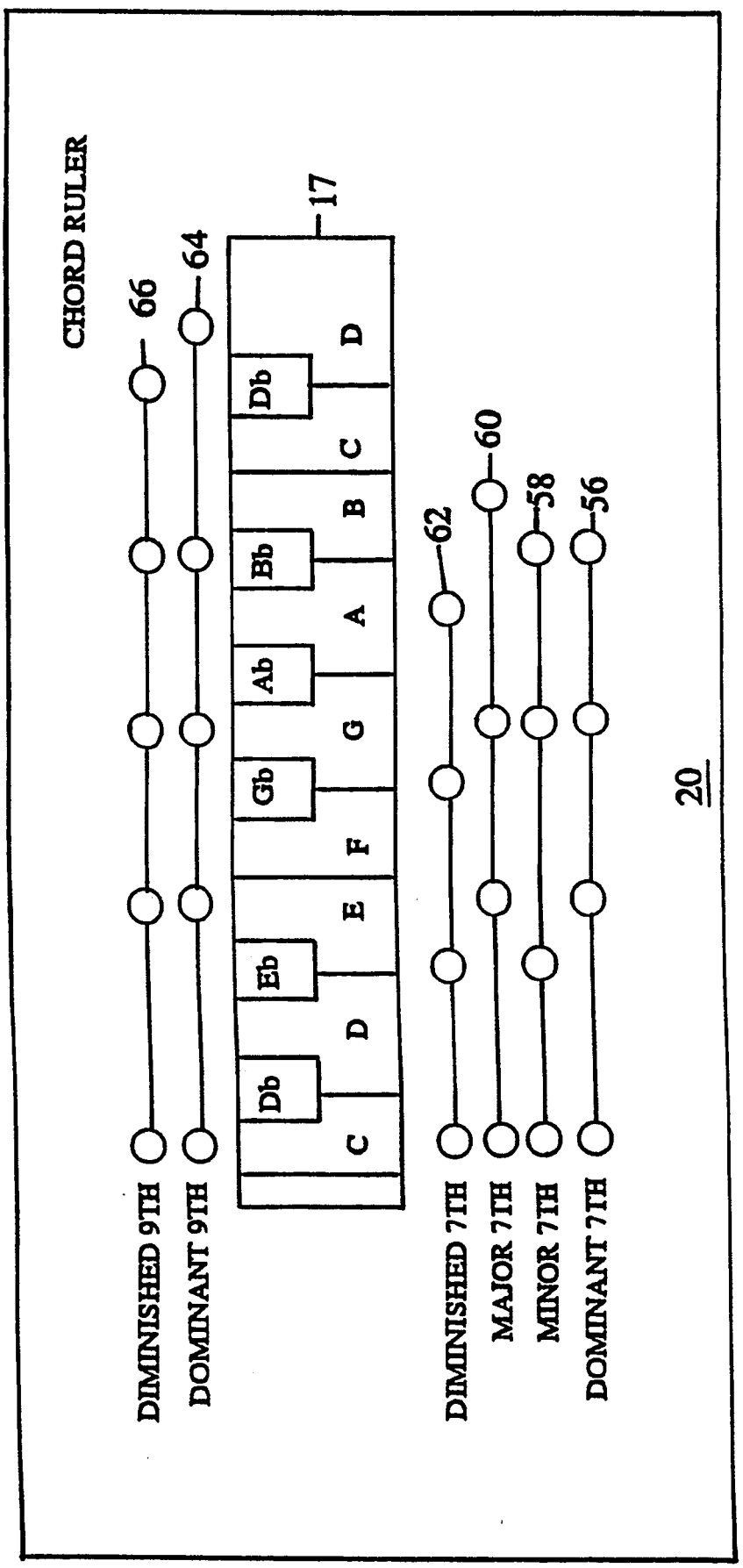
FIG. 1B is a view of the rear portion of the device illustrated in FIG. 1A wherein the seventh chord positions and ninth chord positions are indicated on the fixed member and the octave is again illustrated in the movable member.
Figure 1C:
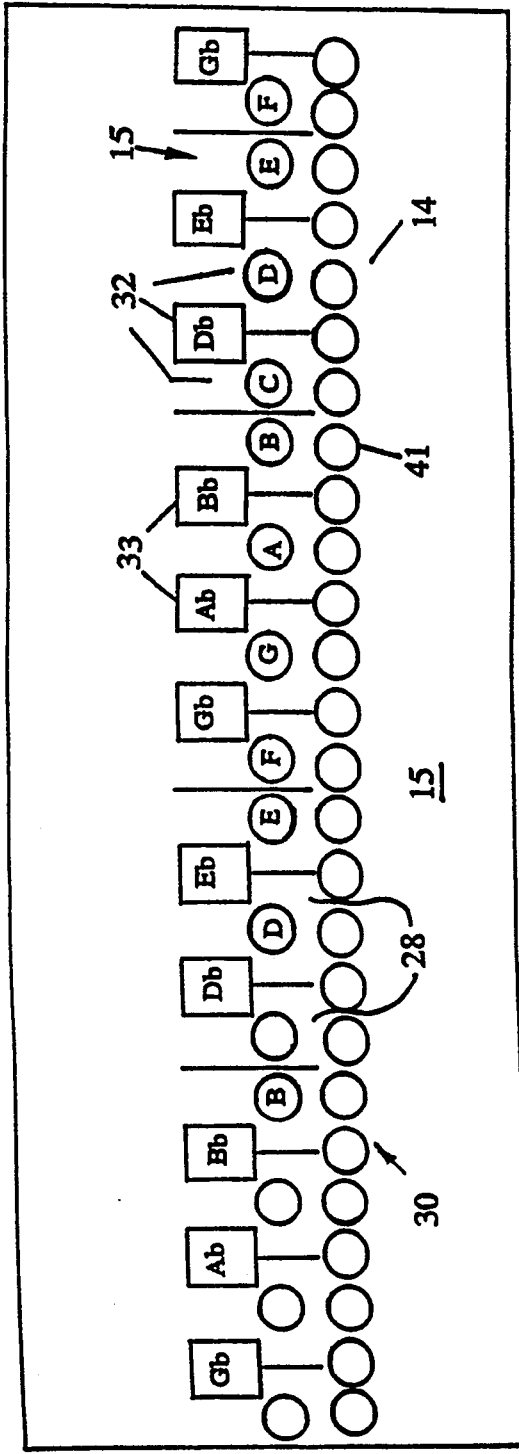
FIG. 1C is a view of the front portion of the movable member.
Figure 1D:
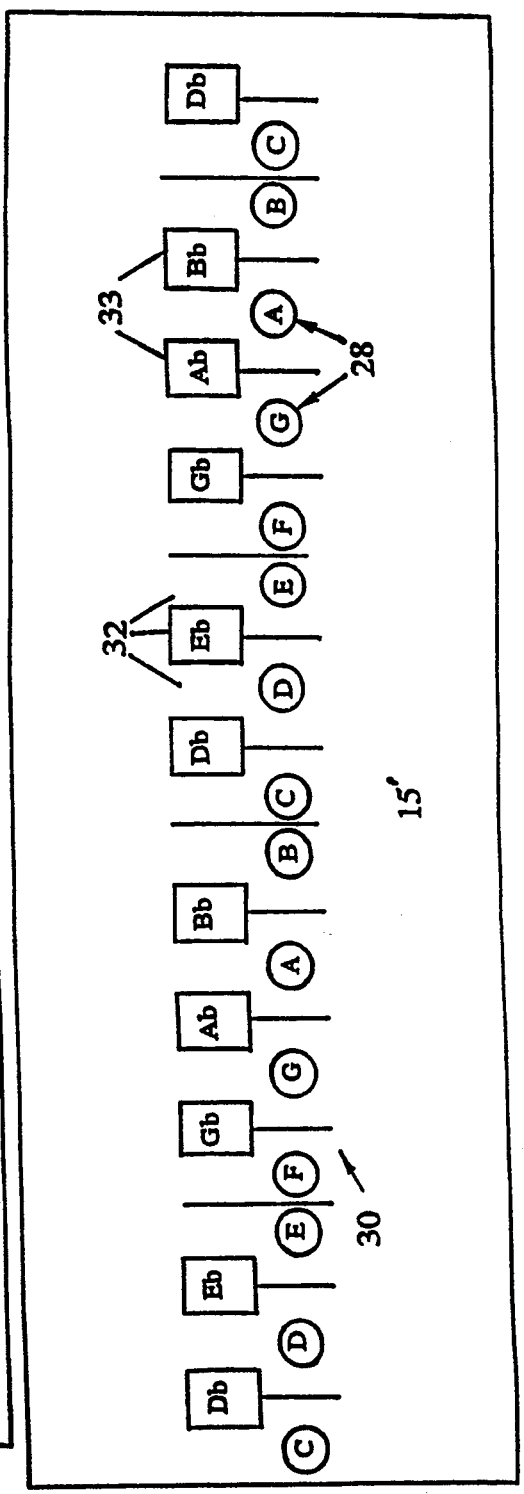
FIG. 1D is a view of the rear portion of the movable member.

Thus it is seen that in a rotational embodiment illustrated in FIGS. 3 through 3F as much information can be provided through the use of the fixed member on both sides and rotatable members on both sides the same amount of information as provided in the slide rule embodiment as shown in FIGS. 1A through 1C.

Another embodiment of the invention 300 is illustrated in FIGS. 4-4E. In this embodiment a rotatable member 302 having sides 303 and 305 (FIGS. 4B & 4C) moves within a fixed member 304 having a first side 306 and a second side 308 (FIG. 4C). A rectangular window 310 provides the octave, while a smaller, circular window 312 provides the key. Similarly on the second side windows 310' and 312' are provided. All 13 keys may be rotated by the gripping rotatable member portion 314 and the key and the related octave will appear in the windows 310, 310'.

Rotatable member sides 303 and 305 include a series of radially extending rectangles 307, 309 of one octave plus two notes, beginning on different notes, and extending radially outwardly form mid portions 311, 313, with key notes 315, 317 in the middle. Rectangles 307, 309 align with openings 310, 310', and keys 313, 315 align with windows 312, 312'.

On the first side 306 the major scale appears below the keyboard on line 316 and the minor scale appears above the keyboard line 318. Note also that both minor scales are included. Using the key of E as a example going up the scale E flat is found on line 318a, and going down the line 319 the relative minor D natural is found.

Below the keyboard the tonic chord is illustrated on line 320. In the case illustrated, the key of E, the tonic includes E, A flat or G sharp and B. The augmented chord is also illustrated on line 322 in the key of E, including E, A flat, and C. The sixth is also found on line 324, in the key of E including E, A flat, B and D flat.

The minor tonic is also illustrated on line 326; in the key of E, the minor tonic is E, G, and B. The augmented minor chord is illustrated on line 328 in the key of E, is E, G, and C. The minor sixth is illustrated on line 330 including, in the key of E, E, G, B and D flat.

On the second side 308 (FIG. 4A) in the same position by merely turning the device over, the diminished seventh can be read on line 332. In the key of E this is E, G, B flat and D flat. The major seventh is found on line 334; in the key of E, this is E, A flat, B, and E flat. The minor seventh is illustrated on line 336; in the key of E this is E, G, B and D. The dominant seventh is illustrated on line 338 and in the key of E this is E, A flat, B, and D natural.

The dominant ninth is illustrated on line 340 and in the key of E this is E, A flat, B, D, and G flat. The diminished ninth is illustrated at 342 and in the key of E this is E, A flat, B, D, and F.

Related chords are viewable on the first side 306 as indicated at 344. The sub-dominant triad is illustrated on line 346; in the key of E, the sub-dominant triad is A' and includes A, D flat and E. The dominant seventh may be read from Line 348; in the key of E the dominant seventh is the B seventh. The B seventh is shown at 348 in an inverted form with G flat, A, B, and E flat. It is to be noted that these related chords in this embodiment are found on the first side and are therefore readily available to the learner without having to turn the device to the second side 308.

This embodiment is particularly easy to use in that both the key and octave are found in separate windows 310, 312, 310', 312' and both the major and minor scales are found on the same side 306 as well as basic chords and related chords 344 for a beginning student to learn. The more sophisticated and advanced material is found on the second side 308. It is not necessary to move the movable member to another position. One merely needs to turn the device over to find the more advanced chords.

Another embodiment of the invention is shown at 400 in FIGS. 5 through 5B. In this device a rotatable member 402 (FIG. 5B) is located between a pair of fixed members 404 (FIG. 5) and 406 (FIG. 5A) rotatably mounted at 401. On each side of movable member 402, a plurality of spokes 403, are provided, each having a pair of scale note rings 405, 409 provided in each spoke 403. Thus on the movable member 402 the notes of the scales in the various spokes 403 are provided in a counter clockwise pattern, whereby the note rings 405 will align with the windows 407, 408, 410 etc. on fixed members 404 and 406 to provide the notes and chords for a given key.

The key is read from the movable member from scale ring 409 at the windows 407, 407' respectively, provided in the edge of fixed members 404 and 406. Member 404 includes a plurality of additional windows at 408, 410, 412, 414, 416, 418, and 420 etc. Using the key of D flat as an example the major scale can be read from first the key position 407 D flat, and then respectively along the line 411 at the windows 408, 410, 412, 414, and 418 and 420 E flat, F, G flat, A flat, B flat and C. Furthermore, the minor third may be read at the window 422; in the example given E natural.

The tonic may be read from a windows 407, 410 and 414 along dotted line 424. The tonic is thus D flat, F, and A flat. The augmented chord can be read from windows 407, 410, and 416. In this case the augmented fifth is in the key of D flat is A natural. Line 417 indicates the augmented fifth chord.

The sixth may be read from the window 418 and from following the line in 424 and then line 419. It is apparent that the sixth for the key of D flat is B flat and the other notes in the sixth are D flat, F, A flat, and B flat.

Additional information can be found by turning the device over (FIG. 5A) to fixed member side 406. On this side the minor scale can be read by following the line 430 from the key windows 407' 432 where the key is indicated from scale ring 409, through windows 434, 436, 438, 440, 442A and 444. These windows give the standard minor scale. Choosing the key of D flat as an example, the windows 432, 434, 436, 438, 440, 442 and 444 reveal that the usual, standard minor scale is D flat, E flat, E natural, G flat, A flat, A, and C. The relative minor going down the scale is found on line 445 from window 442A to the window 446 where B natural is included in the relative minor scale.

The diminished seventh can be read from following the line 450 through the window positions 432a, 436a, 437, 440a, and 454. Thus the diminished seventh and the example of D flat is D flat, F, G natural, and B flat.

The major seventh can be read from following the line 460 through the window positions 432a, 462c, 440f, and 464. Thus the major seventh in the example in the key of D flat, includes D flat, F, A flat and C.

The minor seventh can be read from following the line 470, through the window positions 432a, 436a, 440b, and 446a. In the example of the key of D flat, the minor seventh, is D flat, E natural, A flat, and B natural.

The dominant seventh may be determined from following the line 480 through the positions 432a, 462a, 440d, and 446a. Thus in the example of the key of D flat, the dominant seventh is D flat, (window 462), A flat, and B.

The dominant ninth is obtained from following the line 490 through the window positions 432a, 434a, 462b, 440e, and 446a; thus D flat, F, A flat, B natural and E flat. The diminished nineth can be obtained from following the line 495 through the window positions 432a, 496a, 462d, 440c, and 446a. Thus the notes in the diminished ninth are Db, F natural, A flat, B natural, and D natural. For purposes of clarity in this embodiment it is preferred that the lines provided on the outer members 404 and 406 be provided in dot-dash pattern or contrasting colors to avoid confusion of lines coming close to each other in some instances. However with appropriate contrasting, all of the major and minor scale notes and chords can be read from the embodiment shown in FIGS. 5 through 5C.

Another embodiment of the present invention is found in FIGS. 6–6C. In this embodiment the Chord Reader TM 600 includes a first fixed side 602 and a second side 604. Sides 602 and 604 may be separate members or a folded single member, for example made of strong cardboard. Between these fixed members is a movable memer 606, which is rotatable about a pivot point 601.

On the first fixed side 602 a plurality of long, thin cut out slots are provided; 610, 612, 614, 616, 618, 620, 622, 624, 626, 628, and 630. The slots extend radially outward from a center portion 634 to a peripheral portion 636 where a complete octave of white and black notes 638 is provided, with each slot terminating in one of the notes in the octave 638. White notes D, G, and A occupy a greater portion of the radial pie portions than do E, F, B, and C to maintain the constant peripheral distance 639 between each note in the octave. A key slot is provided in first side 602 at 632.

Similar slots 640, 642, 646, 648, 650, 652, 654, 656, 658, 660, and 662 are provided in fixed member 604, extending outwardly from a center portion 634' to a peripheral portion 638' with an octave of notes 639' spaced in the same manner as distance 639. A key slot 664 is also provided in fixed member 604.

The movable member 606 has two sides 666 and 668 which are shown respectively in FIGS. 6B and 6C. Each includes an outer circular octave including both white and black notes, 670, 670' respectively located to align with respective key slots 632 and 664.

Movable member sides 666, 668, contain a series of radially extending dot-and-dash patterns or color patterns 672, 674 which correspond to the respective slots in sides 602, 604, which indicate respectively the major scale, minor scale, and several chords for the key which is inputed at respective slots 632, 664. There are twelve patterns on side 666 for the major scale and several chords for the input key; 502, 503, 504, 505, 506, 507, 508, 509, 510, 511, and 512 or the twelve keys in the octave. Some patterns contain no notes because all twelve notes are not used in the scales or primary chords in a given key.

On movable member side 668 patterns 521,522, 523, 524, 525, 526, 527, 528, 529, 530, 531, and 532 are provided, which align with the slots on fixed member 604 to show the minor scale and the nineth and seventh chords for the key which is inputed through slot 664. Movable member 606 is rotatable between fixed members 602 and 604 by grasping the peripheral portion thereof 665.

The patterns 501–512 and 521–532 on FIGS. 6B and 6C comprise discontinuous lines or arcs of a circle, which are visible through the slots in fixed members 602 and 604. Thus the major scale may be read from the discontinuous circle 541 including segments 541c, 541d, 541e, 541f, 541g, 541a, and 541b viewable through slots 618, 616, 612, 610, 628, 624, and 620, respectively.

The minor scale or the key of C,C, D, E flat, F, G, A flat, and B, may be read through fixed member 604 from the discontinuous arcs or circle segment 551 in patterns 521–532 found on movable member side 668 found on FIG. 6C. Thus for the same input key C found in slot 664, the minor scale is 551c, 551d, 551e', 551f, 551g, 551a', and 551b, found through respective slots 650, 646, 644, 640, 660, 658, and 652.

The dominant seventh,C, E, G, and B flat for the key of C, may be read from arc circle 552 including segments 552c, 552e, 552g, and 552b' through respective slots 650, 642, 660, and 654. The major seventh for the key of C, C, E, G, and B may be read from the circle 553 including segments 553c, 553e, 553g, and 553b, through the respective slots 650, 642, 660, and 652. The minor seventh, C, E flat, G and b flat for the key of C may be read from the the circle 554 including segments 554c, 554e', 554g, and 554b' through the respective slots, 650, 644, 660, and 654. The diminished seventh, C, E flat, G flat and A for the key of C may be read from the the circle 555 including segments 555c, 555e', 555g', and 555a, through the respective slots 650, 644, 662, and 656.

The dominant ninth for the key of C, C, E, G, B flat and D may be found from the the circle 556 including segments 556c 556e, 556g, 556b' and 556d through the respective slots 650, 642, 660, 654 and 646. The diminished ninth for the key of C is the same as the dominant ninth except that the ninth is flared, or in this case D flat. This chord may be read from the circle 557 including segments 557c, 557e, 557g, 557b' and 557d' through the respective slots 650, 642, 660, 654, and 648.

The major triad may be read from circle 543 including segments 543c, 543e, and 543g through respective slots 618, 612, and 628. The sub-dominant or fourth chord, in the key of C, F may be read from circle 545 including segments 545c, 545f, and 545a in respective slots 618, 610, and 624. The sixth chord may be read from circle 542 including segments 542c, 542e, 542g, and 542a through respective slots 618, 612, 628, and 624. The dominant seventh chord, in the key of C, G, may be read from the circle 544 including segments 544b, 544d, 544f, and 544g through the respective slots 620, 616, 610, and 628. The augmented fifth chord C, E, and A flat, may be read from the circle 546 including segments 546c, 546e, and 546a' through respective slots 618, 612, and 626. The minor tonic may be read from the circle 547 including segments 547c, 547e', and 547g through the respective slots 618, 614, and 628. The minor sixth may be read from the circle 548 including segments 548c, 548e', 548g and 548a through the respective slots 618, 614, 628, and 624.

In addition the DILLARD STAR (TM) 550 found in the center portion of fixed member 602, by following line 552 and 554, respectively, the sub-dominant chord F and the dominant seventh G may be easily found for the given key of C. Other related sub-dominant and dominant chords for the input key may be found in the same way for different input keys.

The minor scale, additional seventh, and ninth chords may be found by merely turning the device over without rotating the movable member. The same input key will be found in slot 664.

Another DILLARD STAR (TM) 550' is also found in center portion 634' is also provided, whereby the related subdominant, and dominant seventh chords for the input key can be easily and quickly determined.

Thus the major scale and many of the chords can be read from side 602, and the minor scale and the more sophisticated chords may be read by merely turning the device over, without resetting the key. This embodiment is well adapted to different colors for the segments on the movable member, but can also be made with dot-and-dash lines, if desired.

As shown in FIG. 7 at 700, this embodiment comprises a member 701 having a first side 702 and a second side 704. A movable member (FIG. 7c) 706 moves between the sides 702 and 704. On the movable member 706 is a keyboard of about 2 octaves. On this keyboard the white notes E, F, D and C are narrower by a factor of about 0.667 than the white notes A, G, and D to maintain a fixed internal space in the plainer domain of the fixed member 701. This is another of the linear type devices.

A series of lines are found upon the fixed member side 702, preferable in contrasting colors, to indicate a variety of information concerning the scales and chords. For example, the key is inputted by the window position 708 in the member 702. If the key of C is chosen as an example, the major scale can be read from following the line 710. In the example illustrated with the key C the major scale is C, D, E, F, G, A, B, C. The minor scale may also be read from line 712, 712u and 712d. The minor scale includes for the key of C: is C, D, E flat, F, G, A flat, B (Line 712u) and C. Down the scale of the relative minor (712d is B flat) is indicated on line 714 including B natural. The tonic is found from following the line 716 including for the key of C: C, E, and G. The major sixth chord is found from following the line 718 including C, E, G, and A. The augmented chord is found from following the line 720 including notes C, E, and G sharp or A flat.

The minor triad can be read from the line 722 including the notes C, E flat, and G. The minor sixth can be read from the line 724 including C, E flat, G and A.

Turning to the other side 704, with the movable member 706 remaining on the same place within the window 726, and using the key of C as an example, the diminished seventh chord may be read from the line 728. Thus in the key of C the diminished seventh is C, E flat, G flat, and A.

The major seventh may be read from the line 730, and using the key of C as an example, the major seventh is C, E, G, and B.

The minor seventh may be read on the line 732 and using the key of C as an example, the minor seventh includes C, E flat, G and B flat.

The dominant seventh can be read from line 734 and using the key of C an an example, the dominant seventh includes C, E, G, and B flat.

The ninth chords are shown above the window 726. The dominant ninth is shown by the line 736 and using the key of C as an example, the dominant ninth is C, E, G, B flat and D. The diminished ninth is shown on the line 738. It differs from the dominant ninth in that the ninth is flatted thus the line 738 extends to D flat instead of D.

It will be apparent that the embodiment shown in FIGS. 7, 7A 7B and 7C has several advantages. In the first place it is clearly keyboard orientated. Particularly piano, organ and accordian students would find this embodiment attractive. Secondly, the key is inputted at the far left and the scale and chords build from the root. Thirdly, it is possible to see at a glance the difference between the major scales, the minor scales, and the various chords. This embodiment is also believed to be inexpensive to manufacture and very practical. It is particularly effective if the legends are provided in color.

Another embodiment of the invention is shown in FIGS. 8–8C. This embodiment 800, includes a fixed member 802 including a series of lines 803.

A movable member 804 (FIG. 8A) is movable vertically relative to the fixed member 802. This embodiment differs from the previous embodiment in that the movable member 804 is movable vertically relative to fixed member 802 and opening 806 therein, while in the previous embodiment the movable member 706 moves laterally relative to fixed member 701 and opening 708.

An input key opening 808 is provided, wherein the key located on the vertical line 809 on movable member 804 is also provided in the opening 808. As was the case with the other linear embodiments, the notes A, G and D are larger in transverse extent than are the white notes E, F, D and G by a factor of about 1.5 to maintain a fixed interval space in the upper half 811 of the scales 813 in member 804. The scales 813 are provided in chromatic order vertically to align with scale opening 806.

In the embodiment illustrated in FIG. 8, and using the example of the key of E flat, indicated in the input key opening 808, the major scale may read by following the dots along the line 810. Thus using E flat as an example, the major scale includes the notes of E flat, F, G, A flat, B flat, C, D, E flat and the ninth is 810f.

The minor scale may be read from following the line 812, 812u and 812d. In the example of E flat the harmonic minor is E flat, F, G flat, A flat, B flat, B, D natural (FIG. 812u) and E flat. The natural minor shown on line 812d is E flat, D flat,B, B flat, A flat, G flat and E flat.

Fixed member 802 includes a second side 842 (FIG. 8C), which includes a key opening 844 and a chord opening 846. Movable member 804 includes a second side 848 which includes a key line 850 and the keyboard positions 852 for all of the chords for the input key and related chords, which are clearly labelled on FIG. 8B.

The major tonic chord can be read from the line 854 (Triad section 855) and line 814 including E flat, G and B flat. The minor tonic can be read from the lines 854, (Ebm) and 816, including E flat, G flat and B flat. The major augmented chord may be read from the lines 854 (Eb+) and 818 including for E flat, G and B natural. The augmented minor chord may be read from the line 820 for E flat, including E flat, G flat and B.

The major sixth can be read from the lines 854 (Section 856, Eb6) and 822, including E flat,G, B flat and C. The minor sixth may read from the section 856 (Ebm6), and line 824 including E flat, G flat, B flat, and C.

The seventh chords can also be found in this embodiment, from section 857 and from lines 825. The dominant seventh is found from section 857 (Eb7), and from line 826 and in the key of E flat, includes the notes E flat, G, B flat and D flat. The minor seventh can be found from section 857 (Ebm7) and along the line 828, including E flat, G flat, B flat and D flat. The major seventh is found in section 857 (Ebma7) and along the line 30 and includes the notes E flat, G, B flat, and D natural. The diminished seventh is found in section 857 (Ebdim) and along the line 832 and includes the notes E flat, G flat, A natural and C natural.

The ninth chords can be found from Sections 857 and 859. the dominant ninth may be found in section 859 (Eb9), and along the line 834, and in key of E flat, includes the notes E flat, G natural, B flat, D flat and F. The diminished ninth is found in Section 859 (Eb-9), and along the line 836 and includes the same notes as the dominant ninth except the diminished ninth is flatted and includes the note E natural, instead of F natural.

Related chords 835 are also shown in this embodiment. In the case of the sub-dominant or the fourth chord, in the case of E flat this is an A flat chord which is found along the line 840 and includes the notes A flat, C natural and E flat. The dominant seventh chord which is primarily encountered in E flat, is the B flat seventh which is found along the line 843. This is shown in an inverted form and includes F, A flat, B flat, and D natural.

To find these same scales and chords in another desired key, the movable member 804 is moved vertically relative to the fixed members 802 and 842 until the desired key is found in the input openings 808 and 844. The same information can then be found in openings 806 and 846 for whatever key is located within the openings 808 and 844.

Another embodiment of the invention is shown in FIGS. 9 and 9A at 900. This embodiment includes an outer fixed member 902 and a movable member 904, which is movable in a rotative manner relative to fixed member 902 The fixed member 902 has a large center opening 906 and located on the movable member is a generally circular line 908 having plurality of position points 910 thereon.

The fixed member 902 contains a plurality of aligned openings in a partially circular shape indicated at 912. In order to input the given key the movable member 904 by means of the cutaway opening 914 is rotated until the key position 916 is aligned with the key segment 917 on the fixed member. In the example given the key position is inputed adjacent the key of C. It is apparent that the scale may be read from the line 908 through the circular opening 906 in fixed member 902, in conjunction with the notes on segment 917. Thus the C scale includes from line 917, C, D, E, F, G, A, B, C, and next octave D, E, F, G, A, B, C, D, and E.

The tonic is found from a series of openings 918 in an arc segment 920 which align with a circular pattern 922 of dots 924. Arc segment 918 reveals the tonic chord for the input key of C is C, E, and G.

The fourth or sub-dominant related chord, the F chord for the key of C can be obtained from reading along the circular line 926 of openings which reveal dots 928 in circular pattern 930. This chord includes in an inverted form C, F, A, C, F, A, C.

The dominant seventh may be found on fixed member line 940 including openings 942 which align with dots 944 on movable member circular segment 946. In the key of C, the dominant seventh is the G seventh which includes D, F, G, and B, in inverted form in line 940.

It is also to be noted that the notes in circular ring 910 are not uniformly spaced. Thus in this ring using the key of C as an example, notes A, G, and D, are larger than the distance between the notes E, F, B, and C, by a factor of about 1.5.

What is claimed is:

1. A chord and scale indicating device comprising;
    at least one fixed card member and at least one movable card member;
    on one of said fixed and movable card members, a scale thereon of at least one octave including both the white and black notes of said octave and wherein the white notes: A, G, D are greater in transverse extent than the white notes: E, F, B, C of the octave by a factor of 1.5;
    the other said fixed and movable card members having thereon a series of indicating positions which indicate at least one scale or chord position for a given key; and
    means for providing relative movement between the fixed card member and the movable card member whereby the card member containing the octave may be moved relative to the card member containing scale and chord positions whereby the scale and chord positions may be determined for each of the notes in said octave by such relative movement.

2. A device according the claim 1, wherein the movable card member includes said octave and the fixed card member includes the positions indicating scale notes and chords.

3. A device according to claim 2, wherein the movable card member moves linearly relative to the fixed card member.

4. A device according to claim 3 wherein the movement is linear and wherein the movable member moves vertically relative to the fixed member.

5. A device according to claim 2, wherein at least one minor scale and at least one chord is provided on said fixed card member for a given key.

6. A device according to claim 5, wherein more than one chord is provided including the sub-dominant of said given key, and the dominant seventh of said given key.

7. A device according to claim 2 wherein on each side of the fixed card member an apperture means is provided for given key and wherein the moveable card member includes two sides, on one said side of the movable card member said octave is provided and on one of said sides of the fixed card member the major and minor scales and chords corresponding to said key are provided and wherein on the other side of the fixed given card member the keyboard positions are provided for at least one musical clef for each key corresponding to said key.

8. A device according to claim 7 wherein the treble and base clefs are provided on said other side of said movable card member.

* * * * *